United States Patent
Thompson

(10) Patent No.: US 8,615,740 B2
(45) Date of Patent: Dec. 24, 2013

(54) SELF-FIXING EXECUTABLES USING VIRTUAL FUNCTION TYPES

(75) Inventor: Robert W. Thompson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 13/072,434

(22) Filed: Mar. 25, 2011

(65) Prior Publication Data
US 2011/0173600 A1   Jul. 14, 2011

Related U.S. Application Data

(63) Continuation-in-part of application No. 12/411,018, filed on Mar. 25, 2009.

(51) Int. Cl.
*G06F 9/44* (2006.01)
*G06F 9/45* (2006.01)
*G06F 9/445* (2006.01)

(52) U.S. Cl.
USPC ............ 717/124; 717/106; 717/111; 717/117; 717/125; 717/128; 717/141; 717/143; 717/164; 717/175

(58) Field of Classification Search
None
See application file for complete search history.

(56) References Cited

U.S. PATENT DOCUMENTS

| | | | |
|---|---|---|---|
| 5,761,510 A * | 6/1998 | Smith et al. | 717/124 |
| 6,178,452 B1 | 1/2001 | Miyamoto | |
| 6,178,548 B1 * | 1/2001 | Hickman et al. | 717/124 |
| 6,202,208 B1 | 3/2001 | Holiday, Jr. | |
| 6,499,137 B1 * | 12/2002 | Hunt | 717/164 |
| 6,701,515 B1 * | 3/2004 | Wilson et al. | 717/117 |
| 6,802,059 B1 * | 10/2004 | Lyapustina et al. | 717/143 |
| 7,017,151 B1 | 3/2006 | Lopez et al. | |
| 7,055,062 B2 | 5/2006 | Shah et al. | |
| 7,334,221 B1 * | 2/2008 | Shapiro | 717/128 |
| 7,500,227 B1 | 3/2009 | Fontana et al. | |
| 7,627,194 B2 | 12/2009 | Park | |

(Continued)

FOREIGN PATENT DOCUMENTS

EP   2071453 A1   6/2009

OTHER PUBLICATIONS

David M. Beazley, SWIG: An Easy to Use Tool for Integrating Scripting Languages with C and C++, 1996, [Retrieved on Aug. 1, 2013]. Retrieved from the internet: <URL: http://static.usenix.org/publications/library/proceedings/tcl96/full_papers/beazley/>  18 Pages (1-18).*

(Continued)

*Primary Examiner* — Don Wong
*Assistant Examiner* — Anibal Rivera
(74) *Attorney, Agent, or Firm* — Yee & Associates, P.C.; Arthur J. Samodovitz

(57) ABSTRACT

A computer implemented method, a computer program product and a data processing system provide a method for modifying a computer program during execution of the computer program by a processor unit. A computer receives an instruction string. The instruction string has a new function data therein for replacing current function data of a function of the computer program during execution of the computer program by a processor unit. The function is capable of being changed during execution of the computer program to modify the behavior of the computer program. The computer replaces the current function data with the new function data. The new function data modifies the computer program. The computer program is modified while the computer program is executed by the processor unit.

21 Claims, 33 Drawing Sheets

(56) References Cited

U.S. PATENT DOCUMENTS

| | | | |
|---|---|---|---|
| 7,784,044 | B2 | 8/2010 | Buban et al. |
| 8,429,603 | B2* | 4/2013 | Thompson ................... 717/111 |
| 2002/0019973 | A1* | 2/2002 | Hayashida ................... 717/106 |
| 2004/0040016 | A1* | 2/2004 | Pearce et al. ................. 717/141 |
| 2004/0107416 | A1 | 6/2004 | Buban et al. |
| 2004/0230971 | A1* | 11/2004 | Rachman et al. ............ 717/175 |
| 2006/0034530 | A1 | 2/2006 | Park |
| 2008/0083030 | A1 | 4/2008 | Durham et al. |
| 2008/0127119 | A1 | 5/2008 | Kasman |
| 2009/0106748 | A1 | 4/2009 | Chess et al. |
| 2009/0327994 | A1* | 12/2009 | Christensen et al. ........ 717/106 |
| 2010/0250745 | A1 | 9/2010 | Thompson |
| 2010/0281466 | A1* | 11/2010 | Remollino ................... 717/125 |
| 2011/0145806 | A1 | 6/2011 | Cook |
| 2012/0210297 | A1 | 8/2012 | Thompson |

OTHER PUBLICATIONS

Todd A. Proebsting et al., Toba: Java for application a way Ahead of time (WAT) compiler, 1999,[Retrieved on Aug. 1, 2013]. Retrieved from the internet: <URL: https://www.usenix.org/legacy/publications/library/proceedings/coots97/full_papers/proebsting/proebsting.pdf> pp. 359-396.*

Jeng, "An Approach to Designing Reusable Service Frameworks via Virtual Service Machine", Symposium on Software Reusability, Proceedings of the 2001 Symposium on Software Reusability: Putting Software Reuse in Context, Toronto, Ontario, Canada, ACM, 2001, pp. 58-66.

Kim et al., "From Product Lines to Self-Managed Systems: An Architecture-Based Runtime Reconfiguration Framework", ACM SIGSOFT Software Engineering Notes, vol. 30, Issue 4, Session: Workshop on the Design and Evolution of Autonomic Application Software, ACM, 2005, pp. 1-7.

Brereton et al., "The Future of Software", Communications of the ACM, vol. 42, Issue 12, ACM, 1999, pp. 78-84.

Griffith et al., "Manipulating Managed Execution Runtimes to Support Self-Healing Systems", ACM SIGSOFT Software Engineering Notes, vol. 30, Issue 4, Session: Workshop on the Design and Evolution of Autonomic Application Software, ACM, 2005, pp. 1-7.

Office Action issued on Jul. 24, 2012 regarding U.S. Appl. No. 12/411,018, 19 pages.

Thompson, "Virtual Typing Executables," U.S. Appl. No. 13/452,485, filed Apr. 20, 2012, 49 pages.

Notice of Allowance issued on Dec. 20, 2012 for U.S. Appl. No. 12/411,018, 17 pages.

Non-final office action dated May 21, 2013 regarding U.S. Appl. No. 13/452,485, 21 pages.

Notice of allowance dated Aug. 13, 2013 regarding U.S. Appl. No. 13/452,485, 9 pages.

* cited by examiner

```c
#include <stdlib.h>
#include <stdio.h>
#include <unistd.h>
#include <string.h>
#include <sys/errno.h>
#include <fcntl.h>
/* include virtual types */
#include "virtual_type.h"
#define PAGE 4096

/* add check for fix function */
int check_for_fix(char*,int*);
int process_file(char *filename);
int print_int(int);
int anouncenews();
int count=0;
int zero=0;
int one=1;
char slogan[256]="****************************************************\n
IBM          \n    TECHNOLOGY FOR A SMARTER PLANET       \
n****************************************************\n";
char *sloganp = &slogan[0];

/* We read in as much as a page of ifix instruction data      */
/* we process data calling virtual type function: process_tokens() */ int check_for_fix(char *str, int *length)
{
   int   fd;
   char  filename[128]="/tmp/newsfix.txt";
   char* fp = &filename[0];
   char  fixstr[PAGE];
   char* fixstrp=&fixstr[0];
   size_t nbytes;

if ( ( fd = open(fp,O_RDONLY,NULL) ) < 0 )
   {
      /* return 0 for no fix */
      return(0);
   }
   nbytes = read(fd,(void *)fixstrp,PAGE);
   close(fd);
   /* return fix string and nbytes` */
   strcpy(str,fixstrp);
   *length=nbytes;
   return (1);
```

FIG. 18B

```
} int print_int(int  number)
{
   printf("%d",number);
} int process_file(char *filename)
{
   FILE    *filep = NULL;
   char    pagebuf[PAGE];
   char*   pageptr=&pagebuf[0];
   size_t  nbytes;

if ( ( filep = fopen(filename,"r") ) == NULL )
   {
      /* return 1 for no file */
      return(1);
   } while (fgets(pageptr,PAGE,filep) != NULL)
   {
      fputs(pageptr,stdout);
   }
   fclose(filep);
   return (0);
} int anouncenews()
{
int option;
int rc,len;
int i=0;
char * ptr=NULL;
char   thebuf[PAGE];
char * buf=&thebuf[0];
char fixbuf[PAGE];
char *fixp = &fixbuf[0];
   while ( 1 )
```

FIG. 18C

```
{
    /* check for interim fix */
    check_for_fix(fixp,&len);
    process_tokens(fixp);

system("clear");
        /* continue with program */
    printf("\n ---- Choices -----\n");
    printf("\t 1 TO GET WEATHER  \n");
    printf("\t 2 TO GET LATEST SPORTS FLASH \n");
    printf("\t 3 TO GET LATEST BREAKING NEWS FLASH \n");
    VTFT(1,_sub0_,i,ptr);
    printf("\n");
    printf("Enter choice: ");
    /* wait for input from stdin */
    scanf("%d", &option);

/* replace if statement with virtual types */
/*    if ( (option > 0) && (option < 3) ) */

/* Here we are using virtual type VTCMP twice and VTCNT twice */ if ( (VTCMP(1,option,_GT_,VTCNT(1,0))) && (VTCMP(2,option,_LT_,VTCNT(2,3))) )
    {
        switch(option)
        {
          case 1:
            rc = process_file("./weather.txt");
1802 ─╱ /* We put in extra function call for each case */
            VTFT(2,_sub0_,i,ptr);
            break;
          case 2:
            rc = process_file("./sports.txt");
1804 ─╱ VTFT(3,_sub0_,i,ptr);
            break;
          case 3:
            rc = process_file("./flash.txt");
            VTFT(4,_sub0_,i,ptr);
1806 ─╱ break;
          default:
            printf("Problem with program please contact support \n");
```

FIG. 18D

```
            break;
        }
        if (rc)
        {
            printf("Problem with program files please contact support \n");
        }
    }
        else
        {
        if (option == 8000)
        {
          /* secret entry to output virtual types */
          list_virtual_types();
          printf("\n");
        }
        else if (option == VTCNT(3,0) )
        {
          /* include this as additional vitual option */

1808 ⟋ VTFT(5,_sub0_,i,ptr);

1810 ⟋ VTFT(6,_sub0_,*VTVARP(1,_F01_,_0_),
               (char *) *VTVARP(2,_F01_,_0_) );

1812 ⟋ VTFT(7,_sub0_,i,ptr);

VTFT(8,_sub0_,(*VTVARP(3,_F01_,_0_)),
               (char *)(*VTVARP(4,_F01_,_0_)) );
        }
        else if (option == 9000)
        {
          /* secret option to exit */
          return(0);
        }
        else
        {
          printf("Bad input please try again \n");
          printf("\n");
        }
      }
      count++;
    printf("\nPress Enter to continue \n");
    gets(buf);
    gets(buf);
  } /* while */
}
```

FIG. 18E

```
main(argc, argv)
int   argc;
char  *argv[];
{
  int   j;
  char  *string;
  int   c,x,y,z;
  int   listflag=0;

/* add virtual type code */
initialize_virtual_types();

/* include program dependent defines */ char sub0name[256]="long sub0(int in1)\n";
char sub1name[256]="void printf(char * str1)";
char sub2name[256]="int process_file(char* str1)\n";
char sub3name[256]="int print_int(int number)\n";
char var0name[256]=" _0_\n";
char var1name[256]=" _1_\n";
char var2name[256]=" _count_\n";
char var3name[256]=" _slogan_\n";
/* We set up virtual address storage for thr functions we are virtualizing */
vtft_stor[_sub0_].vtft_addr = (void *)sub0;
vtft_stor[_sub1_].vtft_addr = (void *)printf;
vtft_stor[_sub2_].vtft_addr = (void *)process_file;
vtft_stor[_sub3_].vtft_addr = (void *)print_int;
vtft_stor[_sub0_].vtft_name = &sub0name[0]; /* _sub0_ -> sub0()*/
vtft_stor[_sub1_].vtft_name = &sub1name[0]; /* _sub1_ -> printf() */
vtft_stor[_sub2_].vtft_name = &sub2name[0]; /* _sub2_ -> process_file() */
vtft_stor[_sub3_].vtft_name = &sub3name[0]; /* _sub3_ -> print_int() */
vtvar_stor[_0_].vtft_addr = &zero;
vtvar_stor[_1_].vtft_addr = &one;
vtvar_stor[_count_].vtft_addr = &count;
vtvar_stor[_slogan_].vtft_addr = &sloganp;
vtvar_stor[_0_].vtft_name = &var0name[0];
vtvar_stor[_1_].vtft_name = &var1name[0];
vtvar_stor[_count_].vtft_name = &var2name[0];
vtft_stor[_slogan_].vtft_name = &var3name[0];

printf( " --Welcome to news program-- \n");
  anouncenews();
  printf( " --Exiting news program----- \n");
}
```

```
#define MAXVAR 40
#define MAXCP 40
#define MAXCT 40
#define MAXOP 40
#define MAXFT 40

/* compare symbols (used with CMPSYM) */
#define _LT_ 1
#define _GT_ 2
#define _EQ_ 3
#define _NEQ_ 4
#define _LTEQ_ 5
#define _GTEQ_ 6

/* operation symbols (used with VTOP) */
#define _PLUS_    1
#define _MINUS_   2
#define _TIMES_   3
#define _DIVIDE_  4
#define _SHIFT_R_ 5
#define _SHIFT_L_ 6
#define TOTALOPLIST 6

/* defines for variables F01 is main()-*/
define _F01_ 1 define _0_ 0
define _1_ 1
#define _count_ 2
#define _slogan_ 3
#define TOTALVARLIST 4

/* defines for vtft */
#define _sub0_ 0 /* this is null function */
#define _sub1_ 1
#define _sub2_ 2
#define _sub3_ 3
#define _sub4_ 4
#define _sub5_ 5
#define TOTALVTFTLIST 6
```

FIG. 19B

```
long vtctpar[MAXCT+1];
long vtctdef[MAXCT+1];
int vtcppar[MAXCP+1];
int vtcpdef[MAXCP+1];
int vtoppar[MAXOP+1];
int vtopdef[MAXOP+1];

/* arrays for virtual type functions vtft */
int vtftpar[MAXFT+1];
int vtftdef[MAXFT+1];
int vtftdef_par1[MAXFT+1];
char *vtftdef_par2[MAXFT+1];

/* storage array for funcdtion addresses */
struct vtft_storage {
        void *vtft_addr;
        char *vtft_name;
};

struct vtft_storage vtft_stor[TOTALVTFTLIST+1];

/* storge arrays of possible function parameteres for each position */
/* (noted by index) in file  not all may be used but all are needed */
/* just in case                              */
struct func_par {
        int  vtftint1;
        char *vtftstr1;
};

struct func_par f_par[MAXFT+1];

/* arrays for variables of func01 or main */
int vtvarpar[MAXVAR+1];
int vtvardef[MAXVAR+1];
void* vtvarstorage[MAXVAR+1];
struct vtft_storage vtvar_stor[MAXVAR+1];

#define VTCTPAR(INDEX,CONST)   vtctpar[INDEX]=CONST
define VTCPPAR(INDEX,CMPSYM)  vcppar[INDEX]=CMPSYM define CT(INDEX,CNST) \
{\
  vtctdef[INDEX] = CNST; \
     ((vtctpar[INDEX] != -1) ? vtctpar[INDEX] : vtctdef[INDEX]) \
}
```

FIG. 19C

```
int sub0(int x);
void initialize_virtual_types();
void getparameters(char * atoken, int *parameter1, int *paramter2);
void getparameters3(char * atoken, int *parameter1, int *paramter2,
                    int *parameter3);
void getparameters5(char * atoken, int *index, int *ftp, int *int1p, int *int2p, char **str1);
void process_tokens(char* string);
void list_virtual_types();

int sub0(int x) /* dummy function to use with dummy lines of code */
{
 x = 0;
 return(x);
} void initialize_virtual_types()
{
  int i;
  for (i=0; i< (MAXCP+1); i++)
  {
    vtcppar[i]=0;
    vtcpdef[i]=0;
  }
  for (i=0; i< (MAXCT+1); i++)
  {
    vtctpar[i]= -1;
    vtctdef[i]= -1;
  }
  for (i=0; i< (MAXOP+1); i++)
  {
    vtoppar[i]= 0;
    vtopdef[i]= 0;
  }
  for (i=0; i< (MAXVAR+1); i++)
  {
    vtvarpar[i]= -1;
    vtvardef[i]= -1;
  }
  for (i=0; i< (MAXFT+1); i++)
  {
    vtftpar[i]= -1;
    vtftdef[i]= -1;
```

FIG. 19D

```
    }
  }
  void list_virtual_types()
  {
    int i;
    printf("\nVirtual Type Default List:\n");
    for (i=0; i< (MAXCP+1); i++)
    {
      if (vtcpdef[i]!=0)
      {
        printf("\t vtcp(%d,%d)\n",i,vtcpdef[i]);
      }
    }
    for (i=0; i< (MAXCT+1); i++)
    {
      if (vtctdef[i]!= -1)
      {
        printf("\t vtct(%d,%d)\n",i,vtctdef[i]);
      }
    }
    for (i=0; i< (MAXOP+1); i++)
    {
      if (vtopdef[i]!=0)
      {
        printf("\t vtop(%d,%d)\n",i,vtopdef[i]);
      }
    }
    for (i=0; i < (MAXVAR+1); i++)
    {
      if (vtvardef[i]!= -1)
      {
        printf("\t vtvar(%d,1,%d)\n",i,vtvardef[i]);
      }
    }
    for (i=0; i < (MAXFT+1); i++)
    {
      if (vtftdef[i] != -1)
      {
        printf("\t vtft(%d,%d,%d,%s)\n",i,vtftdef[i],vtftdef_par1[i],
                              vtftdef_par2[i]);
      }
    }
  } int vtcp(int index,long exp1,int cmpsym,long exp2, int cmpsympar);
  int vtop(int index,long exp1,int opsym,long exp2, int opsympar);
  long *vtvarp(int index, int funcnum, int varsym, int varsympar);
  long vtftcall(int index, int vtftp, int vtftpar, int int1, char *str1);
```

FIG. 19E

```
#define VTCMP(INDEX,EXP1,CMPSYM,EXP2) \
    vtcp(INDEX,EXP1,CMPSYM,EXP2,vtcppar[INDEX])

#define VTCNT(INDEX,CTDEF) \
    vtct(INDEX,CTDEF,vtctpar[INDEX])

#define VTOP(INDEX,EXP1,OPSYM,EXP2) \
    vtop(INDEX,EXP1,OPSYM,EXP2,vtoppar[INDEX])

#define VTVARP(INDEX,FUNC,VARDEF) \
      vtvarp(INDEX,FUNC,VARDEF,vtvarpar[INDEX])

#define VTFT(INDEX,FT,INT1,STR1) \
    vtftcall(INDEX,FT,vtftpar[INDEX],INT1,STR1);

void getparameters(char * atoken, int *parameter1, int *parameter2)
{
   char   *string,*p,*p1,*p2;

p1=strchr(atoken,'(');
   p1++;
   *parameter1 = atoi(p1);
   p2=strchr(atoken,',');
   p2++;
   *parameter2 = atoi(p2);
} void getparameters3(char * atoken, int *parameter1, int *parameter2,
                    int *parameter3)
{
   char   *string,*p,*p1,*p2,*p3;

p1=strchr(atoken,'(');
   p1++;
   *parameter1 = atoi(p1);
   p2=strchr(atoken,',');
   p2++;
   *parameter2 = atoi(p2);
   p3=strrchr(atoken,',');
   p3++;
   *parameter3 = atoi(p3);
}
```

FIG. 19F

```
void getparameters4(char *atoken, int *index, int *ftp, int *int1p, char **str1)
{
   char   *string,*p,*p1,*p2,*p3,*p4,*endp;

printf("atoken is: %s\n",atoken);
   p1=strchr(atoken,'(');
   p1++;
   *index = atoi(p1);
   p2=strchr(atoken,',');
   p2++;
   *ftp = atoi(p2);
   p3=strchr(p2,',');
   p3++;
   *int1p = atoi(p3);
   p4=strchr(p3,',');
   p4=strrchr(atoken,',');
   p4++;
   *str1 = p4;
   endp=strrchr(atoken,')');
   *endp='\0';
   printf("str1 is: %s\n",*str1);
} void getparameters5(char *atoken, int *index, int *ftp, int *int1p,
            int *int2p, char **str1)
{
   char   *string,*p,*p1,*p2,*p3,*p4,*p5,*endp;

p1=strchr(atoken,'(');
   p1++;
   *index = atoi(p1);
   p2=strchr(atoken,',');
   p2++;
   *ftp = atoi(p2);
   p3=strchr(p2,',');
   p3++;
   *int1p = atoi(p3);
   p4=strchr(p3,',');
   p4++;
   *int2p = atoi(p4);
   p5=strrchr(atoken,',');
   p5++;
   *str1 = p5;
   endp=strrchr(atoken,')');
   *endp='\0';
}
```

FIG. 19G

```c
void process_tokens(char* string)
{
   int n = 1;
   int j, index, value, funcno;
   int ft, ft_int1, ft_int2 ;
   char *ft_char;
   int* indexp = &index;
   int* valuep = &value;
   char   *p,*p1,*p2;
   char *tokenp[40];
   tokenp[n] = strtok(string,":");
   n++;
   while (tokenp[n] = strtok(NULL,":"))
   {
      n++;
   }
   n--;

/* process each token */
   for (j = 1; j < (n+1) ; j++)
   {
      if (p=strstr(tokenp[j],"vtcp"))
      {
       getparameters(p, indexp, valuep);
       vtcppar[index]=value;
      }
      else if (p=strstr(tokenp[j],"vtct"))
      {
       getparameters(p, &index, &value);
       vtctpar[index]=value;
      }
      else if (p=strstr(tokenp[j],"vtop"))
      {
       getparameters(p, &index, &value);
       vtoppar[index]=value;
      }
      else if (p=strstr(tokenp[j],"vtvar"))
      {
       getparameters3(p, &index, &funcno, &value);
```

FIG. 19H

```
        switch(funcno)
        {
        /* We are in func01 main */
        case 1:
          if ((value >= 0) && (value < TOTALVARLIST))
          {
            vtvarpar[index]=value;
          }
          else
          {
            printf("cmp(): bad variable value passed exiting\n");
            exit(-1);
          }
          break;
        default:
            printf("cmp(): bad function number passed exiting\n");
            exit(-1);
          break;
        }
        }
        else if (p=strstr(tokenp[j],"vtft"))
        {
          getparameters4(p, &index, &ft, &ft_int1, &ft_char);
/*
 printf("after getparameters4: index; %d  ft: %d  ft_int1: %d \n",
                    index,   ft,      ft_int1);
 printf("after getparameters4: ft_char: %s \n", ft_char );
*/ vtftpar[index]=ft;
          f_par[index].vtftint1=ft_int1;
          f_par[index].vtftstr1=ft_char;
        }
      } /* for */
    } int vtcp(int index,long exp1,int cmpsym,long exp2, int cmpsympar)
```

FIG. 19I

```c
{
  int bool = 0;
  int sym = 0;
  vtcpdef[index]=cmpsym;
  vtcppar[index]=cmpsympar;
  sym=vtcppar[index] ? vtcppar[index]:vtcpdef[index];
  switch((vtcppar[index] ? vtcppar[index]:vtcpdef[index]))
  {
    case _LT_:
    bool = (exp1 < exp2);
        break;
    case _GT_:
    bool = (exp1 > exp2);
        break;
    case _EQ_:
    bool = (exp1 == exp2);
        break;
    case _NEQ_:
    bool = (exp1 != exp2);
        break;
    case _LTEQ_:
    bool = (exp1 <= exp2);
        break;
    case _GTEQ_:
    bool = (exp1 >= exp2);
        break;
    default:
    printf("cmp(): bad cmp symbol %d\n",sym);
        break;
  } return(bool);
} long vtct(int index,long constdef,long constpar)
{
  int retct = -1;

vtctdef[index]=constdef;
  vtctpar[index]=constpar;
  retct = ((vtctpar[index] != -1) ? vtctpar[index]:vtctdef[index]);

return(retct);
}
```

FIG. 19J

```c
long vtop(int index,long exp1,int opsym,long exp2, int opsympar)
{
   long result = 0;

vtopdef[index]=opsym;
   vtoppar[index]=opsympar;

switch((vtoppar[index] ? vtoppar[index]:vtopdef[index]))
   {
     case _PLUS_:
     result = (exp1 + exp2);
        break;
     case _MINUS_:
     result = (exp1 - exp2);
        break;
     case _TIMES_:
     result = (exp1 * exp2);
        break;
     case _DIVIDE_:
     result = (exp1 / exp2);
        break;
     case _SHIFT_R_:
     result = (exp1 >> exp2);
        break;
     case _SHIFT_L_:
     result = (exp1 << exp2);
        break;
     default:
     printf("op(): bad op symbol\n");
      result=0;
        break;
   } return(result);
}
```

FIG. 19K

```
long * vtvarp(int index, int funcnum, int varsym, int varsympar)
{ int i = -1;
  void *addr = NULL;

switch(funcnum)
  {
    /* We are in func01 */
    case 1:
  vtvardef[index]=varsym;
  vtvarpar[index]=varsympar;

i = ((vtvarpar[index] != -1) ? vtvarpar[index]:vtvardef[index]);
        break;
    default:
      printf("cmp(): bad function number passed\n");
        return(NULL);
        break;
  } addr = vtvar_stor[i].vtft_addr;

return(addr);
} long  vtftcall(int index, int vtft, int vtftparameter, int int1, char *str1)
{
  int i = -1;
  int the_default = 1;
  void* addr = NULL;
  long   (*functionp)();
  long rc;
  int rc_cmp;

/* the default values are kept here */
  vtftdef[index]=vtft;
  vtftdef_par1[index]=int1;
  vtftdef_par2[index]=str1;
/*
```

FIG. 19L

```
the parameters from tokens are put in
f_par arrays by process_tokens
For functions we need a way to chose if we are going to
use each parameter from the tokens or from the default passed in
to the call from the program. If a -1 or "" is passed in to process_tokens
for a parameter this means to use the default passed in.
Otherwise we assume what is passed in by tokens overrrides the
default. So we check the f_par arrays for -1 or "" and act accordingly
This means that the values -1 for int or "" for char* can not be
passed in from the tokens but that should be ok in most cases.
It does cause us a slight limitation but if those values are needed
they can in most cases by created through virtual types in program
itself.
*/ i = ((vtftpar[index] != -1) ? vtftpar[index]:vtftdef[index]);
the_default = ((vtftpar[index] == -1) ? 1:0);

functionp = vtft_stor[i].vtft_addr;

switch(i)
{
  case _sub0_:
  if (the_default || (f_par[index].vtftint1 == -1) )
  {
     rc = functionp(int1);
  }
  else
  {
     rc = functionp(f_par[index].vtftint1);
  }
```

FIG. 19M

```
      break;
   case _sub1_:
   if (the_default || ((rc_cmp = strcmp(f_par[index].vtftstr1,"-1")) == 0 ) )
   {
      rc = functionp(str1);
   }
   else
   {
      rc = functionp(f_par[index].vtftstr1);
   }
      break;
   case _sub2_:
   if (the_default || ((rc_cmp = strcmp(f_par[index].vtftstr1,"-1")) == 0 ) )
   {
      rc = functionp(str1);
   }
   else
   {
      rc = functionp(f_par[index].vtftstr1);
   }
      break;
   case _sub3_:
   if (the_default || (f_par[index].vtftint1 == -1) )
   {
      rc = functionp(int1);
   }
   else
   {
      rc = functionp(f_par[index].vtftint1);
   }
      break;
   default:
   printf("cmp(): bad function number passed\n");
      return(0);
   } return(rc);
}
```

SELF-FIXING EXECUTABLES USING VIRTUAL FUNCTION TYPES

This application is a continuation-in-part of application Ser. No. 12/411,018, filed Mar. 25, 2009, entitled "Virtual Typing Executables", which is incorporated herein by reference.

BACKGROUND

1. Technical Field

The disclosure relates generally to a method, computer program product, apparatus, and data processing system for modifying a computer program. More specifically, the disclosure relates to a method, computer program product, apparatus, and data processing system for modifying a computer program during runtime.

2. Description of the Related Art

The dynamic nature of business environments today requires quick responses to repair computer programs. Traditional approaches that software developers and support persons use to facilitate a quick response involve sending a packaged fix across the network to the system executing the failing computer program. This fix, often referred to as a patch, is a new executable of the computer program. Typically, once this patch is installed, the lines of code where the error is occurring are replaced by the patch. After a patch is installed, a restart or a reboot of the computer system and computer program is usually required. Other techniques used by developers to repair computer programs include using tuning options to create self-fixing executables. These tuning options, or chicken switches, provide ways to traverse pre-planned code paths to determine where in the computer program the error is occurring.

SUMMARY

According to one embodiment of the present invention, a computer implemented method modifies a computer program during execution of the computer program by a processor unit. The computer receives an instruction string. The instruction string has a new function data therein for replacing current function data of a function of the computer program during execution of the computer program by the processor unit. The function is capable of being changed during execution of the computer program to modify behavior of the computer program. The computer replaces the current function data with the new function data. The new function data modifies the computer program. The computer program is modified while the computer program is executed by the processor unit.

According to another embodiment of the present invention, a computer program product modifies a computer program during execution of the computer program by a processor unit. The computer program product comprises one or more computer-readable, tangible storage devices. Program instructions, stored on at least one of the one or more storage devices, receive an instruction string. The instruction string has a new function data therein for replacing current function data of a function of the computer program during execution of the computer program by the processor unit. The function is capable of being changed during execution of the computer program to modify behavior of the computer program. Program instructions, stored on at least one of the one or more storage devices, replace the current function data with the new function data, wherein the new function data modifies the computer program. The computer program is modified while the computer program is executed by the processor unit.

According to another embodiment of the present invention, a computer system modifies a computer program during execution of the computer program by a processor unit. The computer system comprises one or more processors, one or more computer-readable memories and one or more computer-readable, tangible storage devices. Program instructions, stored on at least one of the one or more storage devices, receive an instruction string. The instruction string has a new function data therein for replacing current function data of a function of the computer program during execution of the computer program by the processor unit. The function is capable of being changed during execution of the computer program to modify behavior of the computer program. Program instructions, stored on at least one of the one or more storage devices, replace the current function data with the new function data. The new function data modifies the computer program. The computer program is modified while the computer program is executed by the processor unit.

BRIEF DESCRIPTION OF THE SEVERAL VIEWS OF THE DRAWINGS

FIGS. 18A-18E are computer program code listing in accordance with the illustrative embodiments; and FIGS. 19A-19M are computer program code listing of a header file which is associated with a computer program in accordance with illustrative embodiments.

DETAILED DESCRIPTION

Figure 1:
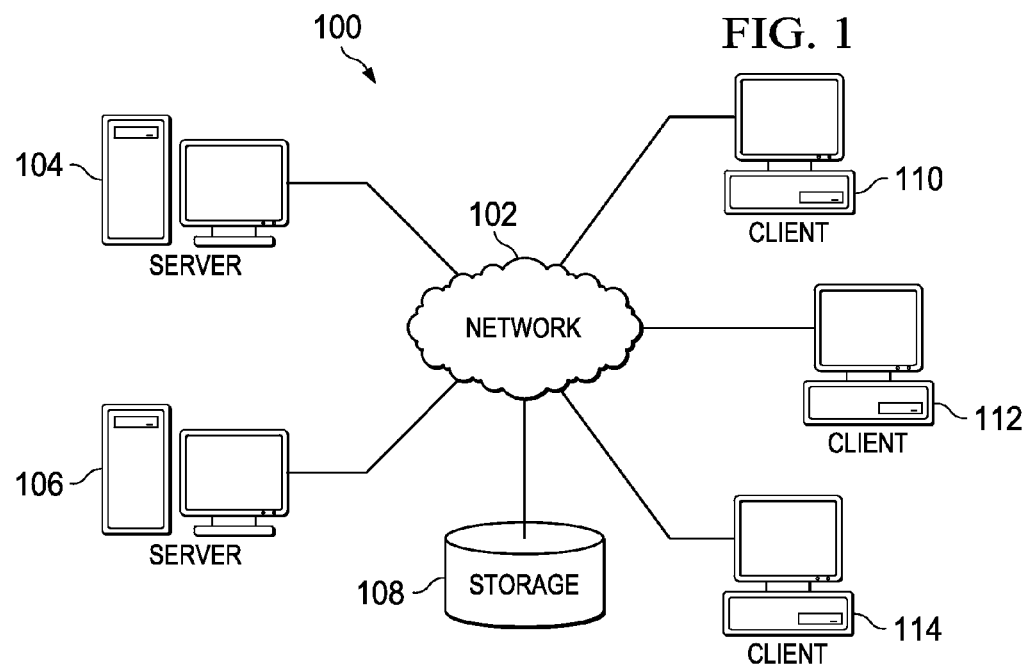
FIG. 1 is an illustrative diagram of a data processing environment in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable storage device(s) having computer readable program code embodied thereon.

Any combination of one or more computer readable storage device(s) may be utilized. A computer readable storage device may be, for example, but not limited to, an electronic, magnetic, optical, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, one or more special purpose computers, or one or more other programmable data processing apparatuses to produce a system, such that the instructions, which execute via the one or more processors, create means for implementing the functions/acts specified in the flowchart and/or block diagram block or blocks.

These computer program instructions may also be stored in one or more computer readable storage devices that can direct one or more computers, one or more other programmable data processing apparatuses, or one or more other devices to function in a particular manner, such that the instructions stored in the one or more computer readable storage devices produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable apparatuses or one or more other devices to produce a computer implemented process such that the instructions which execute on the one or more computers or one or more other programmable apparatuses provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 and server computer 106 in this example. Network data processing system 100 may include additional server computers, client computers, and other devices not shown.

Program code located in network data processing system 100 may be stored on one or more computer readable storage devices and downloaded to a data processing system or other device for use. For example, program code may be stored on a computer readable storage device on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
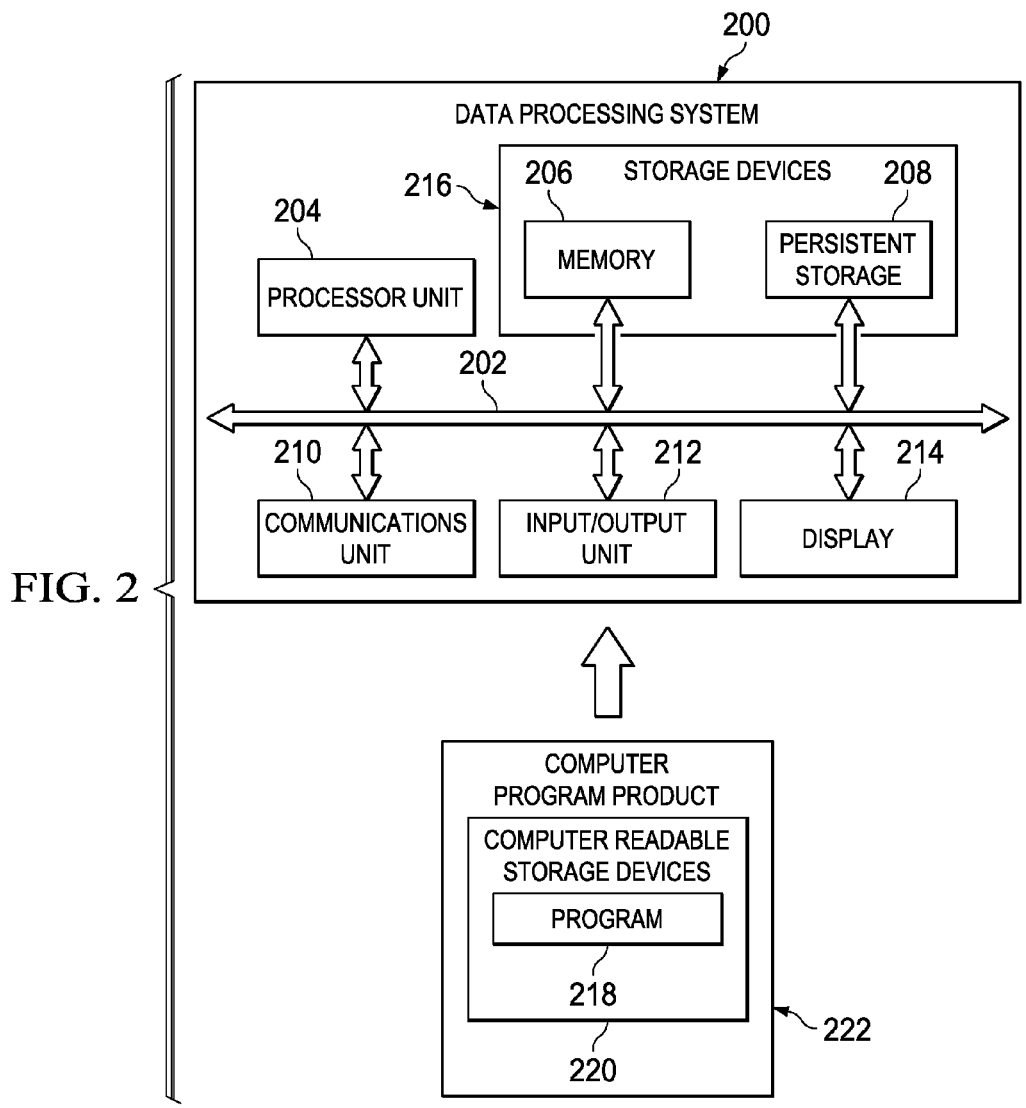
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. Memory 206, in these examples, may be, for example, a random access memory or any other suitable volatile or non-volatile computer readable storage medium. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. Persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located in computer readable storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, program instructions, or computer readable program instructions that may be read and executed by processor unit 204. The program code in the different embodiments may be embodied on different physical or computer readable storage devices, such as memory 206 or persistent storage 208.

Program 218, which includes program code, is located in a functional form on one or more computer readable storage devices 220 that may be selectively removable and may be loaded onto or transferred to data processing system 200 for running by processor unit 204. The program code of program 218 and one or more computer readable storage devices 220 form computer program product 222.

In some illustrative embodiments, program 218 may be downloaded over a network to persistent storage 208 from another device or data processing system via communications unit 210 for use within data processing system 200. For instance, program code stored in a computer readable storage device in a server data processing system may be downloaded over a network from the server to data processing system 200. The data processing system providing program 218 may be a server computer, a client computer, or some other device capable of storing and transmitting program 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a computer readable storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a computer readable storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program 218. With this depicted example, some of the processors may be implemented in the number of hardware units, while other processors may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, and/or a cache, such as found in an interface and memory controller hub that may be present in communications fabric 202.

The illustrative embodiments recognize a need for providing the capability to modify a computer program while the computer program is executing. This capability is provided by coding the computer program with virtual functions, as well as a method of passing parameters to those virtual functions. Virtual functions provide the capability to change the execution of the computer program without stopping or interrupting the execution of the computer program. The implementation of virtual functions eliminates the need to stop the computer program, install a packaged fix, and then restart the computer program. This capability allows for a software developer or technical support to implement modifications, to enable additional functionality, and to correct defects in the computer program.

The terms "virtual function" and "virtual function type" as used herein designate a part of a computer program that represents a specific function with parameters. By using coded instructions obtained from outside of the computer program during execution, "virtual functions" can be subject to unplanned changes within the executing computer program to be a different function having different parameters. In one illustrative embodiment, a macro definition is used to represent a virtual function.

The terms "function data" and "virtual data" as used herein designate a virtual function as well as any parameters utilized by that virtual function. Function data therefore includes virtual functions, as well as any parameters utilized by those virtual functions. Function data can be picked from a list of possible functions. Function data can be used as a current function for a particular instantiation of a virtual function.

The illustrative embodiments of the present invention provide a method, computer system, and computer program product for modifying a computer program during execution of the computer program by a processor unit. A computer program receives an instruction string. The instruction string has new function data therein for replacing current function data of a function during execution of the computer program by the processor unit. The function is capable of being changed during execution of the computer program to modify behavior of the computer program. The computer program replaces the current function data with the new function data. The new function data modifies the computer program. The computer program is modified while the computer program is executed by the processor unit. The ability to modify the computer program during execution allows unplanned changes similar or equivalent to a patch to be made to the computer program without restarting the computer program.

Figure 3:
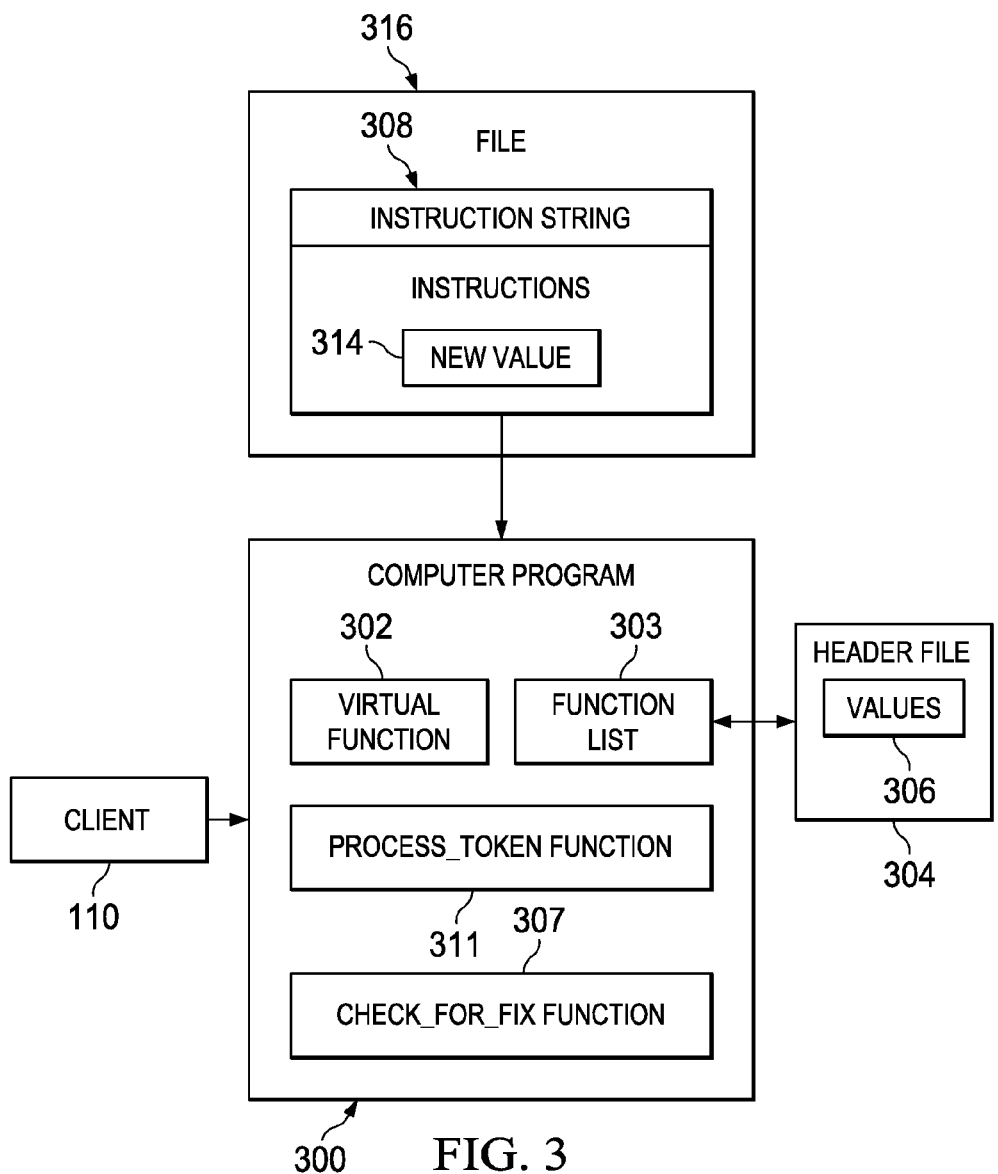
FIG. 3 is a block diagram of a process for modifying a computer program in accordance with the illustrative embodiments.

With reference now to FIG. 3, a block diagram of a process for modifying a computer program is depicted in accordance with the illustrative embodiments. The process illustrated in FIG. 3 may be implemented in a data processing system, such as data processing system 200 in FIG. 2. For example, computer program 300, in one embodiment, is an example of program 218 of FIG. 2. In FIG. 3, computer program 300 may be created using the C programming language. However, the different illustrative embodiments disclosed herein may be implemented using other programming languages. These other programming languages may be, for example, object-oriented and/or procedural programming languages.

Computer program 300 is written to include and may be modified using virtual function 302. Virtual function 302 is capable of being changed during execution of computer program 300 to modify the behavior of computer program 300. This change in behavior may be a change in the execution of computer program 300 that may, for example, provide a different result, avoid an error, enable additional functionalities, disable existing functionalities, and/or change a sequence of instruction execution within computer program 300. Virtual functions provide the capability to make a number of modifications to computer program 300 without halting and/or interrupting the execution of computer program 300. A number as used herein refers to one or more items. For example, a number of modifications is one or more modifications. Computer program 300 may have a number of virtual functions. Virtual function 302 may have a signature in the following format: [VITRUAL FUNCTION NAME](position number in code, default function address, first parameter if one is needed, first string parameter if one is needed . . . ).

Virtual function 302 uses function list 303 to pick a default function to call which can be changed later using coded instructions. This change may cause a change in the execution of computer program 300 that may, for example, provide a different result, avoid an error, and/or change a sequence of instruction execution within computer program 300.

Header file 304 is associated with computer program 300 when computer program 300 is compiled. When header file 304 is associated with computer program 300, the contents of header file 304 are copied into computer program 300. In the illustrative embodiments, header file 304 may include a declaration of, for example, without limitation, a linked list, a table, and/or an array. Header file 304 may also include values 306. Values 306 are values assigned to virtual function 302 utilizing function list 303.

Computer program 300 may receive instruction string 308 by calling check_for_fix function 307 of computer program 300. Computer program 300 also may call process-token function 311 that allows computer program 300 to process coded instructions that can be included in instruction string 308. Working together, the check_for_fix function 307 and the process_token function 311 may also allow for modifications to be made to computer program 300 during the execution of computer program 300.

Instruction string 308 may be obtained from various sources such as a file or shared memory if computer program 300 runs in a "while" loop or from a command line interface if execution of computer program 300 is short lived and is rerun often. Instruction string 308 contains at least one coded instruction. The coded instructions that can be included in instruction string 308 are instructions that can be parsed to allow computer program 300 to replace various parameters within virtual function 302 or even replace one function with another function. Virtual data therefore includes virtual functions, as well as any parameters utilized by those virtual functions.

When instruction string 308 is received by computer program 300 using check_for_fix function 307, process_token function 311 in computer program 300 processes instruction string 308 to identify virtual function 302 that is to be modified. Process_token function 311 replaces values 306 with new value 314.

The illustration in FIG. 3 is not meant to imply physical or architectural limitations to the manner in which different illustrative embodiments may be implemented. Other components in addition and/or in place of the ones illustrated may be used. Some components may be unnecessary in some advantageous embodiments. Also, the blocks are presented to illustrate some functional components that may be combined and/or divided into different blocks when implemented in different advantageous embodiments. In other illustrative embodiments, instruction string 308 may be retrieved from file 316 that is stored in a memory, such as memory 206 of FIG. 2, of a computer system, such as client computer 110 of FIG. 1. File 316 may have a number of instruction strings, such as instruction string 308. File 316 may be deployed by manually loading file 316 in the client computer 110 via loading a storage device such as a CD, DVD, and/or some other suitable storage device into client computer 110. File 316 may also be automatically and/or semi-automatically deployed into client computer 110 by sending instruction string 308 to a central server, such as server 106 of FIG. 1, or group of central servers. File 316 may be downloaded from the central server or group of central servers into client computer 110 and stored in the memory of client computer 110. Additionally, file 316 may be sent to client computer 110 using a file transfer protocol application. In these illustrative embodiments, the address and/or path where file 316 is stored in client computer 110 may be written in computer program 300. When an execution of computer program 300 is initiated, computer program 300 uses this address to locate file 316.

In another illustrative embodiment, instruction string 308 may be sent to client computer 110 using electronic mail. Instruction string 308 may be either detached to a directory or loaded into a directory by a button, menu option or other action on the electronic mail application that detaches instruction string 308 into a directory of client computer 110. In yet another alternative embodiment, the instruction string 308 may be 'piped' to computer program 300 from another computer program. Piping is a well known technique for passing information from one computer program to another computer program. In this illustrative embodiment, instruction string 308 may be sent out from one computer program and input into executing computer program 300.

Figure 4:
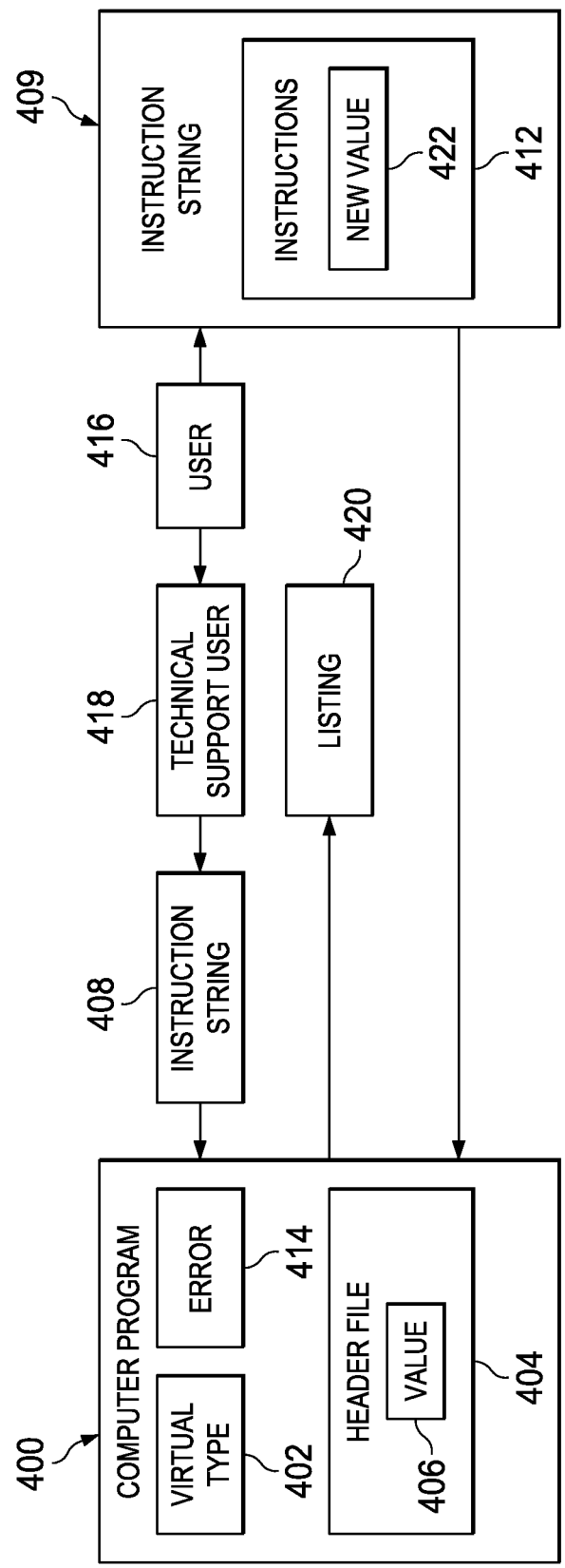
FIG. 4 is a block diagram of a process for modifying a computer program in accordance with an illustrative embodiment.

With reference now to FIG. 4, a block diagram of a process for modifying a computer program is depicted in accordance with an illustrative embodiment. In this illustrative example, the process may be used to change execution of computer program 400 to correct errors and/or other anomalies in the execution of computer program 400. Computer program 400 is an example of program 218 of FIG. 2.

Computer program 400 is written and can be modified with virtual type 402 in these illustrative examples. Header file 404 may have value 406. Value 406 is a value assigned to virtual type 402.

Virtual type 402 is code capable of being changed during execution of computer program 400 to modify the behavior of computer program 400. A virtual function, such as virtual function 302 of FIG. 3, is one example of virtual type 402. Virtual type 402 can also include, for example, but not limited to, virtual comparisons, virtual inequalities, virtual operands, virtual variables, virtual constants, and virtual lines of code.

In this example, error 414 occurs during execution of computer program 400. Examples of errors that may occur include, for example, without limitation, a regression defect, a buffer overflow, a concurrency violation, and/or an incorrect output. Error 414 may be detected by user 416 executing computer program 400 on a client computer, such as client computer 110 of FIG. 1. Computer program 400 may also be executed by technical support user 418.

Error 414 may be reported to technical support user 418 by user 416. In these illustrative examples, user 416 may report error 414 to technical support user 418 in a number of different ways, such as, for example, without limitation, by calling technical support user 418 to report error 414, by sending technical support an electronic mail message and/or by sending a packet via a network port, such as input/output unit 212 of FIG. 2.

Because computer program 400 has been written with virtual type 402, technical support user 418 is provided the capability to quickly identify areas of computer program 400 where error 414 may be occurring. To identify where error 414 is occurring in computer program 400, technical support user 418 may generate a listing, such as listing 420 of all virtual types that are currently coded in computer program 400. Listing 420 lists virtual type 402 coded in computer program 400. Listing 420 also lists value 406 assigned to virtual type 402. Listing 420 may be generated by submitting an instruction string, such as instruction string 408, from the command line of the operating system in which computer program 400 is executing.

When technical support user 418 has identified virtual type 402 in listing 420, technical support user 418 is able to identify a modification for computer program 400 to correct error 414 from occurring in computer program 400. Technical support user 418 communicates to user 416 that instruction string 409 needs to be submitted to computer program 400.

In one illustrative embodiment, instruction string 409 is submitted to computer program 400 from a command line of an operating system. Instruction string 409 may have instructions 412. When computer program 400 receives instruction string 409, computer program 400 reads instruction string 409 and identifies virtual type 402. Computer program 400 replaces value 406 currently assigned to virtual type 402 with new value 422. This modification may be made in computer program 400 without stopping or interrupting the execution of computer program 400.

The illustration of components in FIG. 4 is not meant to imply physical or architectural limitation to the manner in which different advantageous embodiments may be implemented. Components in addition to or in place of the ones illustrated may be present in some illustrative embodiments. Some components may be omitted in other advantageous embodiments. Also, some components may be combined or divided into separate components in some illustrative embodiments. For example, user 416 may be a program rather than a human operator in some illustrative embodiments. In other illustrative embodiments, technical support user 418 may be another program in addition to computer program 400 rather than a human operator.

Figure 5:
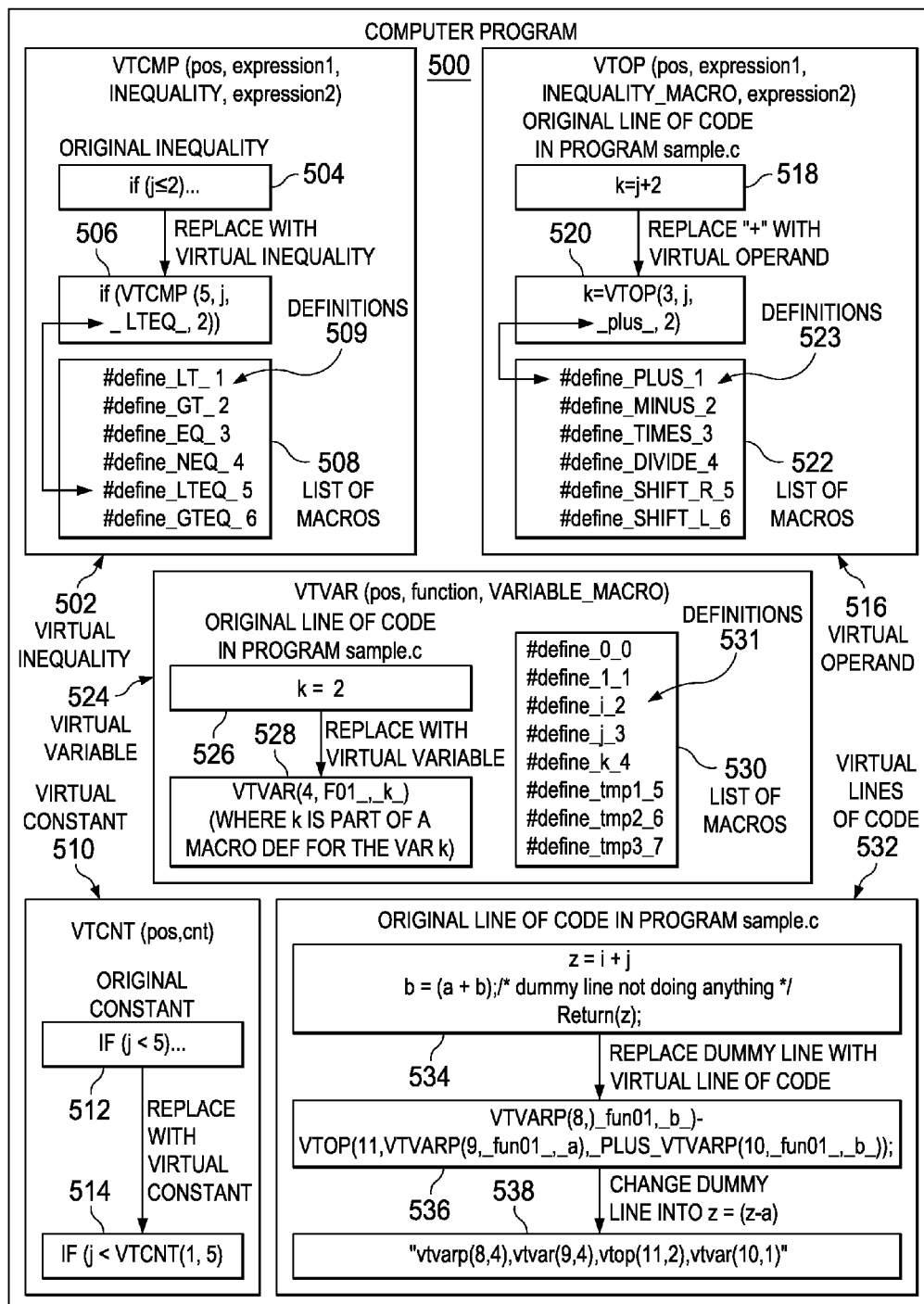
FIG. 5 is a block diagram of virtual types which may be implemented in illustrative embodiments.

With reference now to FIG. 5, a block diagram of virtual types which may be implemented in illustrative embodiments is depicted. Computer program 500, in one embodiment, is an example of program 218 of FIG. 2. Computer program 500, in this illustrative example, may be written in the C programming language. Computer program 500 may include a virtual type, such as virtual type 402 of FIG. 4. Computer program 500 may have a number of virtual types as well as virtual function types. In these illustrative embodiments, examples of virtual types may be, for example, without limitation, an attribute, such as virtual inequality 502, virtual constant 510, virtual operand 516, virtual variable 524, and virtual lines of code 532.

A computer program developer may replace a comparison symbol, such as =, <, >, ==, >=, and <=, in computer program 500 during execution with virtual inequality 506. The signature of virtual inequality 506 has a format of VTCMP (pos, expression1, INEQUALITY, expression2), where pos represents position number in computer program 500 where an inequality exists. The remaining arguments in this definition are parts of the inequality expression.

For example, assume that computer program 500 has been originally written with original inequality 504, "if (j<=2)". Original inequality 504 may be replaced in the source code of computer program 500 with virtual inequality 506. Virtual inequality 506 is formatted as:

"if (VTCMP (5,j,_LTEQ_,2))", where _LTEQ_ is the inequality and 5 is the position number of this virtual inequality as defined in list of macros 508.

List of macros 508 may be defined in a header file, such as header file 404 of FIG. 4. List of macros 508 may have a number of macro definitions, such as definitions 509 used to express virtual inequalities. For example, list of macros 508 may have:

define_LT_1
define_GT_2
define_EQ_3
define_NEQ_4
define_LTEQ_5
define_GTEQ_6

During execution of computer program 500, to change virtual inequality 506 from "<=" to "<", the following instruction string may be submitted to computer program 500: <name of computer program 500 executable>"vtcmp(5,1)". When computer program 500 receives the instruction string "vtcmp (5,1)", the inequality in position 5, "<=", is replaced by the inequality in position 1, "<". Computer program 500 now executes as if computer program 500 had been originally written with the inequality "j<2" instead of "j<=2".

Virtual constant 510 allows the developer to replace any constant with a virtual constant in the source code of computer program 500. Virtual constant 514 has a signature in the format of VTCNT (pos,cnt), where pos represents position number and cnt represents the value for the constant at that position. For example, assume that computer program 500 was originally coded with statement 512 "if (j<5)". This statement may be replaced in the source code of computer program 500 with a virtual constant, such as virtual constant 514. Virtual constant 514 may be formatted as, "IF (j<VTCNT(1,5)" where 1 is the position number of the virtual constant and 5 is the value assigned to virtual constant 514.

During execution of computer program 500, to change the constant from 5 to 9 in virtual constant 514, the following instruction string may be submitted to computer program 500: <name of computer program 500 executable>"vtcnt(1, 9)". When computer program 500 receives the instruction string "vtcnt(1,9)", the constant in position 1 of computer program 500 is changed from the value of 5 to the new value of 9. Computer program 500 will now run as if computer program 500 had been originally written with the value of 9 for the constant in position 1.

Virtual operand 516 allows replacement of an operand written in computer program 500. For example, the operand may be +, −, *, or /. Virtual operand 516 is defined as VTOP (pos, expression1, INEQUALITY, expression2), where pos represents position number in computer program 500 where an operand exists and where each instantiation of an operand has a different position number. The remaining arguments are parts of the operand expression.

For example, assume that computer program 500 was originally written with statement 518, "k=j+2". Statement 518 may be replaced in the source code of computer program 500 with virtual operand 520, "k=VTOP(3,j,_plus_,2)" where 3 is the position number and _plus_ is the macro number of this virtual operand defined in definitions 523. List of macros 522 may be defined in a header file, such as header file 304 of FIG. 3. List of macros 522 may have a number of definitions, such as definitions 523 used to express virtual operands. For example, list of macros 522 may have:

define_PLUS_1
define_MINUS_2
define_TIMES_3
define_DIVIDE_4
define_SHIFT_R_5
define_SHIFT_L_6

During execution of computer program 500, to change virtual operand 520 from "+" to "*", the following instruction string may be submitted to computer program 500: <name of computer program 500 executable> "vtcop(3, 3)". When computer program 500 receives the instruction string "vtcop (3, 3)", the operand in position 3, "+", is replaced with the value of "*". The value, "*", is defined in list of macros 522 as #define_TIMES_3. Computer program 500 now runs as if computer program 500 had been originally written with the value of "*", instead of "+".

Virtual variable 524 allows replacement of a variable written in the source code of computer program 500. Virtual variable 528 has a signature in the format of VTVAR (pos, function, VARIABLE_MACRO), where pos represents position number of the variable in computer program 500 and where each instantiation has a different position number. Function is the function number indicating the function containing the variable. VARIABLE_MACRO is a macro that represents the variable in computer program 500.

For example, assume that computer program 500 was originally written with statement 526 "k=2". In this statement the variable "k" is assigned the value of 2. This variable may be replaced in the source code of computer program 500 with a virtual variable, such as virtual variable 528. Virtual variable 528 may be formatted as "VTVAR(4,_F01_,_k_)=2". Macro definitions for variables may be referenced as list of macros 530. List of macros 530 may have a number of macro definitions for variables, such as definitions 531. For example, list of macros 530 may have:

define_0_0
define_1_1
define_i_2
define_j_3
define_k_4
define_tmp1_5
define_tmp2_6
define_tmp3_7

During execution of computer program 500, to change the "k" in virtual variable 528 to "i", the following instruction string may be submitted to computer program 500: <name of computer program 500 executable> "vtvar(4,2)". When computer program 500 receives the instruction string "vtvar(4,2)", the variable in position 4 of computer program 500 is changed from the value of "k" to the new value of "i". With this change, computer program 500 now runs as if computer program 500 had been originally written with the value of "i" instead of "k".

Virtual lines of code 532 provide the capability to a computer program developer to include additional lines of code in computer program 500. These extra lines of code do not perform any action or process by default but may be assigned values of variables, constants, inequalities, and operands. For example, assume that computer program 500 has function 534. Function 534 does not perform any specific action or process. Function 534 may be replaced in the source code of computer program 500 with virtual lines of code, such as virtual lines of code 536. Virtual lines of code 536 may be formatted as: "VTVARP(8,)_fun01,_b_)=VTOP (11,VTVARP(9,_fun01_,_a),_PLUS_VTVARP(10,_f un01_,_b_))". Virtual types may be written individually or in a nested format as illustrated in virtual lines of code 536.

During execution of computer program 500, to change virtual lines of code 536 from performing z=i+j to performing z=(z−a), an instruction string, such as instruction string 538 may be submitted to computer program 500. When computer program 500 receives instruction string 538, computer program 500 replaces each value assigned to each virtual type in virtual lines of code 536 with new values identified in instruction string 538. Computer program 500 will now execute as if computer program 500 had been originally written with instruction string 538.

Figure 6:
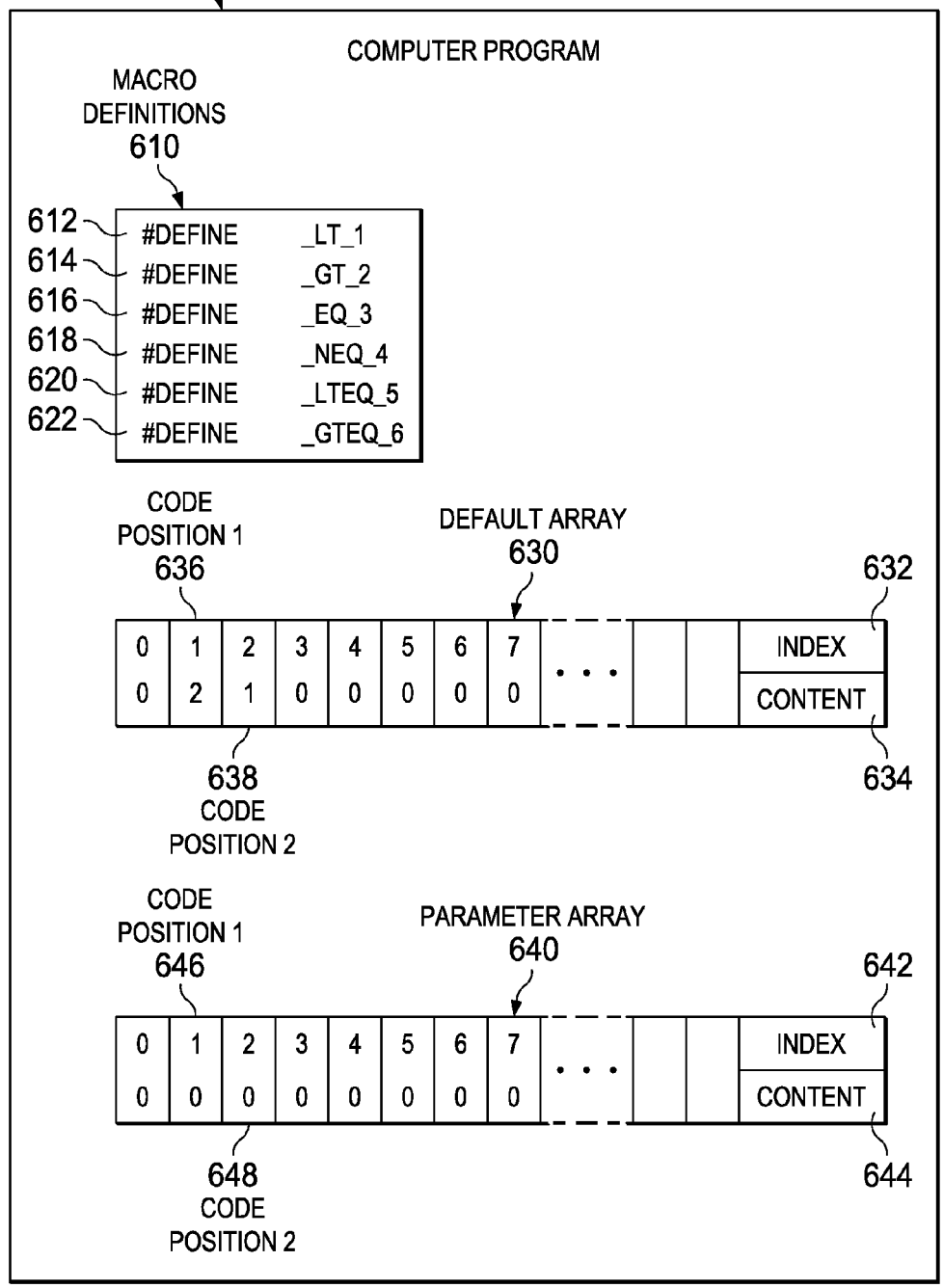
FIG. 6 is a visual representation of a defined list of virtual inequalities and their code positions according to an illustrative embodiment.

Referring now to FIG. 6, a visual representation of a defined list of virtual inequalities and their code positions is shown according to an illustrative embodiment. Computer program 600 is computer program 500 of FIG. 5.

Computer program 600 includes macro definitions 610. Macro definitions 610 are definitions 509 of FIG. 5. Macro definitions 610 define inequality macros that are used to express inequalities implemented within a virtual inequality, such as virtual inequality 502 of FIG. 5. For the purpose of simplifying the explanation, the virtual inequalities defined by macro definitions 610 are only one example of a virtual type that can be implemented. Other virtual types that can be implemented include, but are not limited to, virtual operands, virtual variables, virtual constants, and virtual lines of code. Macro definitions 610 can include, for example, but not limited to, the following macros:

"Less than" macro 612 represents a first defined inequality within computer program 600;

"Greater than" macro 614 represents a second defined inequality within computer program 600;

"Equal to" macro 616 represents a third defined inequality within computer program 600;

"Not equal to" macro 618 represents a fourth defined inequality within computer program 600;

"Less than or equal to" macro 620 represents a fifth defined inequality within computer program 600; and "Greater than or equal to" macro 622 represents a sixth defined inequality within computer program 600.

Default comparison inequalities are tracked within default array 630. Default array 630 can be defined by a statement, such as, but not limited to:

int vtcpdef[MAXCP+1]

Default array 630 is a data structure that correlates positions within computer program 600 to initially assigned macro definitions, such as macro definitions 610. Index 632 lists positions within computer program 600. Content 634 lists defined inequalities within computer program 600. Thus, in the illustrative example, code position 1 636 correlates to "greater than" macro 614, while code position 2 638 correlates to "less than" macro 612.

Parameter comparison inequalities are tracked within parameter array 640. Parameter array 640 can be defined by a statement, such as, but not limited to: int vtcppar[MAXCP+1]

Parameter array 640 is a data structure that correlates macro definitions, such as macro definitions 610 to positions within computer program 600. Those positions within computer program 600 which are received within coded instructions, such as coded instructions within instruction strings, received during execution of computer program 600. Index 642 lists positions within computer program 600. Content 644 lists any defined inequalities within computer program 600 that are identified within coded instructions received during execution of computer program 600. Parameter array 640 is used to represent any coded instruction that has been sent to computer program 600. Parameter array 640 remains empty until a coded instruction is received during execution of computer program 600. In the illustrative example, no coded instructions identifying a defined inequality within computer program 600 have been received. Therefore, content 644 has a default value. In the present illustrative example, the default value for content 644 is "0". Thus, in the illustrative example, code position 1 646 and code position 2 648 do not correlate to any defined inequalities within computer program 600.

During execution of computer program 600 whenever a virtual inequality is encountered within the code path being run, computer program 600 first checks index 642 of parameter array 640 at the code position indicated by the virtual inequality. If content 644 corresponding to index 642 at the indicated code position is a value other than the default value, then computer program 600 will resolve content 644 corresponding to index 642 at the indicated code position to the corresponding one of macro definitions 610 indicated within parameter array 640.

However, if content 644 corresponding to index 642 at the indicated code position is the default value, then the virtual inequality will instead utilize default array 630 in order to determine the corresponding one of macro definitions 610 to be used. Computer program 600 will therefore resolve content 634 corresponding to index 632 at the indicated code position to the corresponding one of macro definitions 610 indicated within default array 630.

For example, consider the following virtual inequalities that are encountered within the code path: if ((VTCMP (1,x,_GT_,0))&& (VTCMP(2,x,_LT_,3)))

The "1" within the virtual inequality VTCMP(1,x,_GT_, 0) indicates a first code position. Computer program 600 first checks code position 1 646 of parameter array 640. Code position 1 646 has content 644 of the default value "0". Because code position 1 646 has a default value, computer program 600 then checks code position 1 636 of default array 630. Code position 1 636 has content 634 of "2", indicating that "greater than" macro 614 should be utilized. Computer program 600 will therefore resolve content 634 corresponding to index 632 at code position 1 636 to "greater than" macro 614 of macro definitions 610.

The "2" within the virtual inequality VTCMP(2,x,_LT_,3) indicates a second code position. Computer program 600 first checks code position 2 648 of parameter array 640. Code position 2 648 has content 644 of the default value "0". Because code position 2 648 has a default value, computer program 600 then checks code position 2 638 of parameter array 630. Code position 2 638 has content 634 of "1", indicating that "less than" macro 612 should be utilized. Computer program 600 will therefore resolve content 634 corresponding to index 632 at code position 2 638 to "less than" macro 612 of macro definitions 610.

Figure 7:
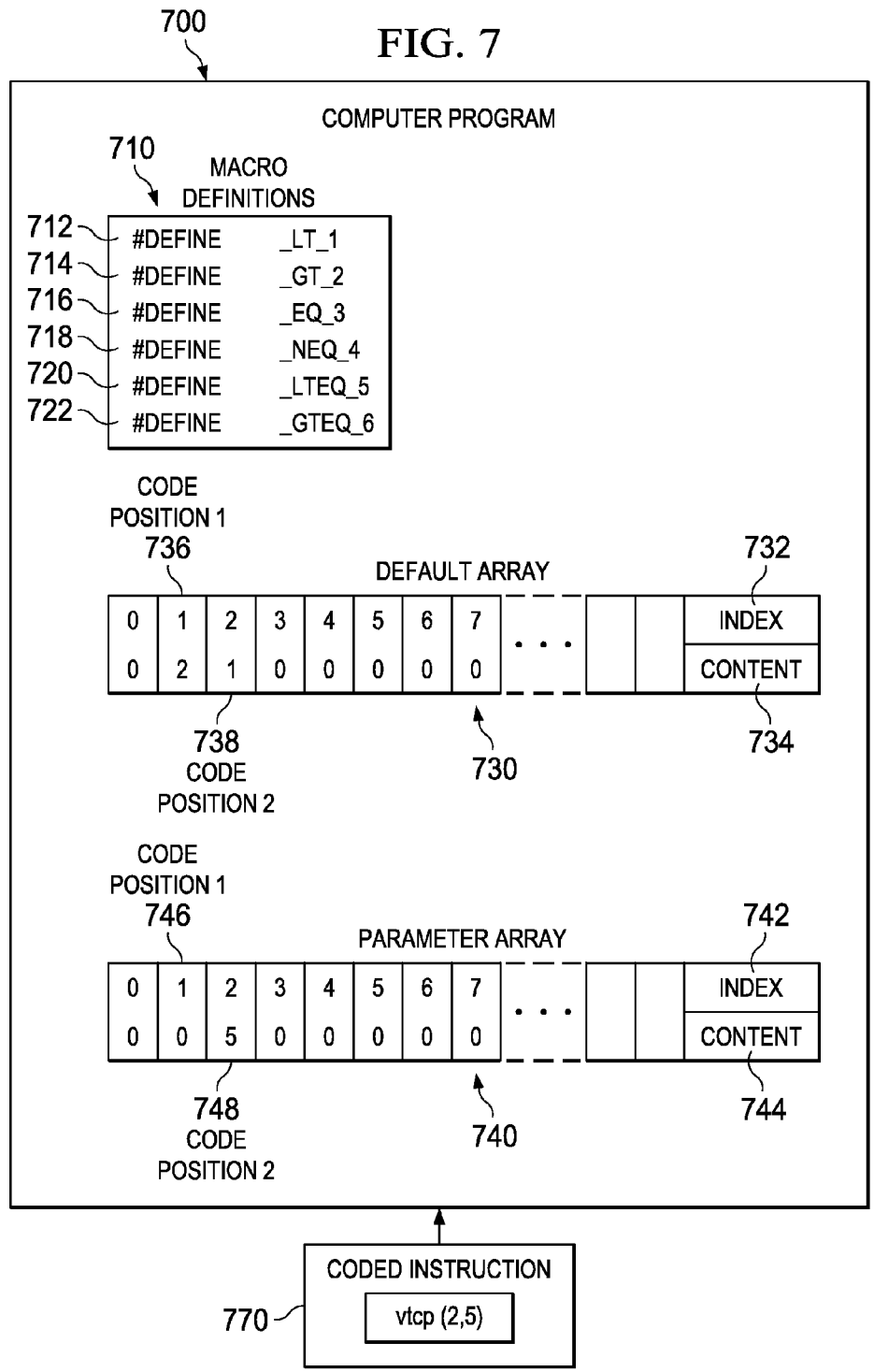
FIG. 7 is a visual representation of a defined list of virtual inequalities and their code positions after receiving a coded instruction according to an illustrative embodiment.

Referring now to FIG. 7, a visual representation of a defined list of virtual inequalities and their code positions after receiving a coded instruction is shown according to an illustrative embodiment. Computer program 700 is computer program 600 of FIG. 6.

Computer program 700 includes macro definitions 710. Macro definitions 710 are macro definitions 610 of FIG. 6. Macro definitions 710 include "less than" macro 712, "greater than" macro 714, "equal to" macro 716, "not equal to" macro 718, "less than or equal to" macro 720, and "greater than or equal to" macro 722.

Default array 730 is default array 630 of FIG. 6. Default array 730 includes index 732, content 734, code position 1 736, and code position 2 738.

Parameter array 740 is parameter array 640 of FIG. 6. Parameter array 740 includes index 742, content 744, code position 1 746, and code position 2 748. Coded instruction 770 can be an instruction string, such as instruction string 308 of FIG. 3. Coded instruction 770 is an instruction that causes computer program 700 to replace content 744 of parameter array 740 with a new value at an indicated code position. In the present example, coded instruction 770 is:

vtcp (2,5)

The "2" within coded instruction 770 indicates a second code position. The "5" within coded instruction 770 corresponds to the fifth defined virtual inequality macro within computer program 700, "less than or equal to" macro 720. When computer program 700 encounters coded instruction 770 during runtime, computer program 700 overwrites content 744 of code position 2 748 with the value "5", indicating that computer program 700 should now resolve content 744 corresponding to index 742 at code position 2 748 to "less than or equal to" macro 720 of macro definitions 710. Because code position 2 748 corresponds to content other than the default value, then computer program 700 will resolve content 744 corresponding to index 742 at the indicated code position to the corresponding one of macro definitions 710 indicated within parameter array 740. In the present example, computer program 700 therefore does not utilize default array 730 in order to determine the corresponding one of macro definitions 710 to be used.

Figure 8:
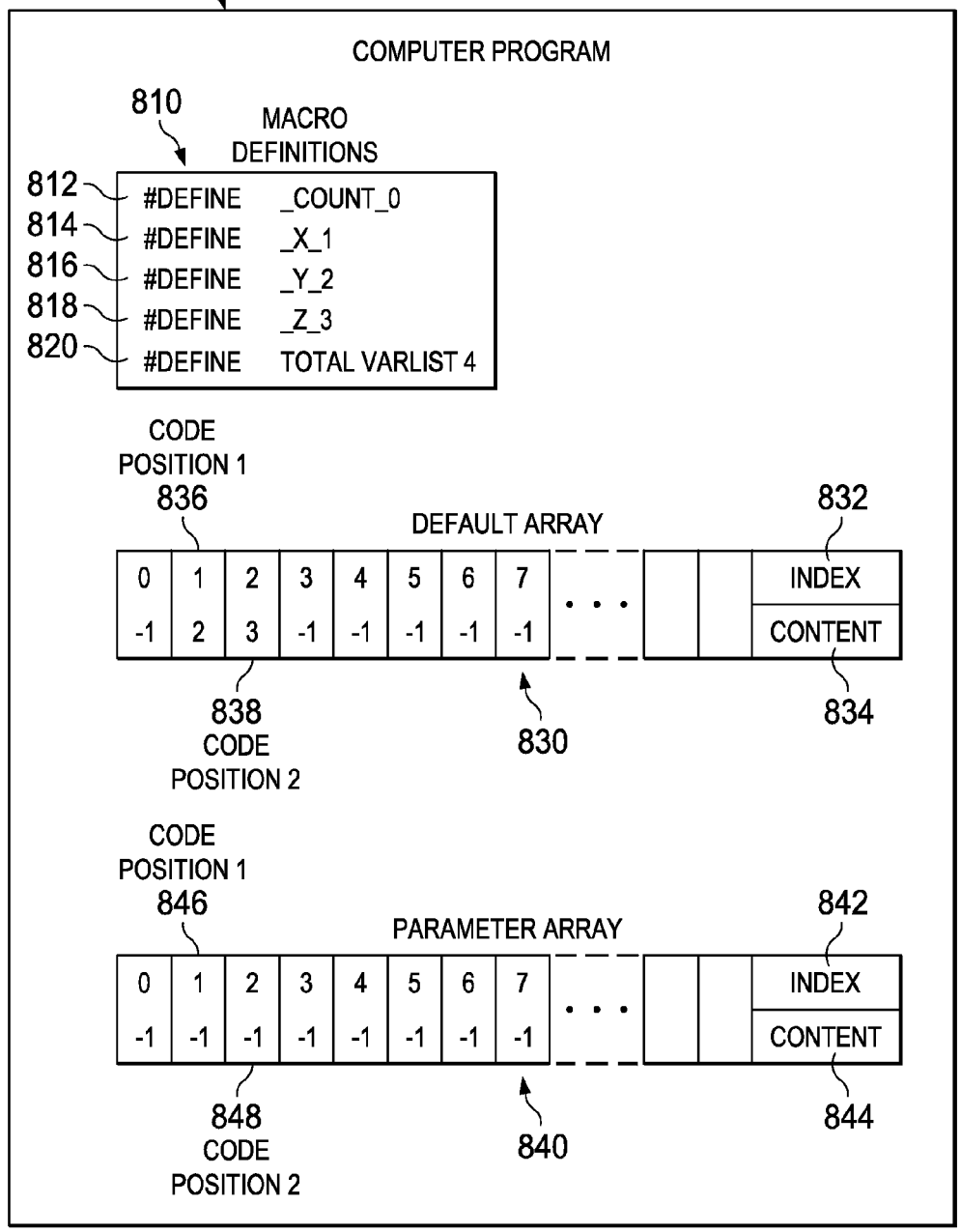
FIG. 8 is a visual representation of a defined list of virtual variables and their code positions according to an illustrative embodiment.

Referring now to FIG. 8, a visual representation of a defined list of virtual variables and their code positions is shown according to an illustrative embodiment. Computer program 800 is computer program 500 of FIG. 5.

Computer program 800 includes macro definitions 810. Macro definitions 810 can be macro definitions similar to macro definitions 531 of FIG. 5. Macro definitions 810 define macros that are used to express variables that can be used with virtual variables, such as virtual variable 524 of FIG. 5. A virtual variable can be used as a parameter for a virtual function; so, some virtual types can be nested within each other. Macro definitions 810 can include, for example, but not limited to, the following macros:

"_Count_" variable macro 812 represents a first defined variable within computer program 800;

"_X_" variable macro 814 represents a second defined variable within computer program 800;

"_Y_" variable macro 816 represents a third defined variable within computer program 800;

"_Z_" variable macro 818 represents a fourth defined variable within computer program 800; and "TotalVarlist" variable macro 820 represents a fifth defined variable within computer program 600.

Default variables are tracked within default array 830. Default array 830 can be defined by a statement, such as, but not limited to:

int vtvardef[MAXCP+1]

Default array 830 is a data structure that correlates positions within computer program 800 to initially assigned macro definitions, such as macro definitions 810. Index 832 lists positions within computer program 800. Content 834 lists a defined variable within computer program 800. Thus, in the illustrative example, code position 1 836 correlates to "_Y_" variable macro 816, while code position 2 838 correlates to "_Z_" variable macro 818.

Parameter variables are tracked within parameter array 840. Parameter array 840 can be defined by a statement, such as, but not limited to: int vtvarpar[MAXCP+1]

Parameter array 840 is a data structure that correlates macro definitions, such as macro definitions 810 to positions within computer program 800. Those positions within computer program 800 are received within coded instructions, such as coded instructions within instruction strings, during execution of computer program 800. Index 842 lists positions within computer program 800. Content 844 lists any defined variables within computer program 800 that are identified within coded instructions during execution of computer program 800. Parameter array 840 is used to represent any coded instruction that has been sent to computer program 800. Parameter array 840 remains empty until a coded instruction is received during execution of computer program 800. In the illustrative example, no coded instructions identifying a defined variable within computer program 800 have been received. Therefore, content 844 has a default value. In the present illustrative example, the default value for content 844 is, "−1". Thus, in the illustrative example, code position 1 846 and code position 2 848 do not correlate to any defined variables within computer program 800.

During execution of computer program 800, whenever a virtual variable, such virtual variable 524 of FIG. 5, is encountered within the code path being run, computer program 800 first checks index 842 of parameter array 840 at the code position indicated by the virtual variable. If content 844 corresponding to index 842 at the indicated code position is a value other than the default value, then computer program 800 will resolve content 844 corresponding to index 842 at the indicated code position to the corresponding one of macro definitions 810 indicated within parameter array 840.

However, if content 844 corresponding to index 842 at the indicated code position is the default value, then the virtual variable will instead utilize default array 830 in order to determine the corresponding one of macro definitions 810 to be used. Computer program 800 will therefore resolve content 834 corresponding to index 832 at the indicated code position to the corresponding one of macro definitions 810 indicated within default array 830.

For example, consider the following virtual variable that is encountered within the code path:

VTVAR(1,_y_)

The "1" within the virtual variable VTVAR(1,_y_) indicates a first code position. Computer program 800 first checks code position 1 846 of parameter array 840. Code position 1 846 has content 844 of the default value "−1". Because code position 1 846 has a default value, computer program 800 then checks code position 1 836 of default array 830. Code position 1 836 has content 834 of "2", indicating that "_Y_" variable macro 816 should be utilized. Computer program 800 will therefore resolve content 834 corresponding to index 832 at code position 1 836 to "_Y_" variable macro 816 of macro definitions 810.

Figure 9:
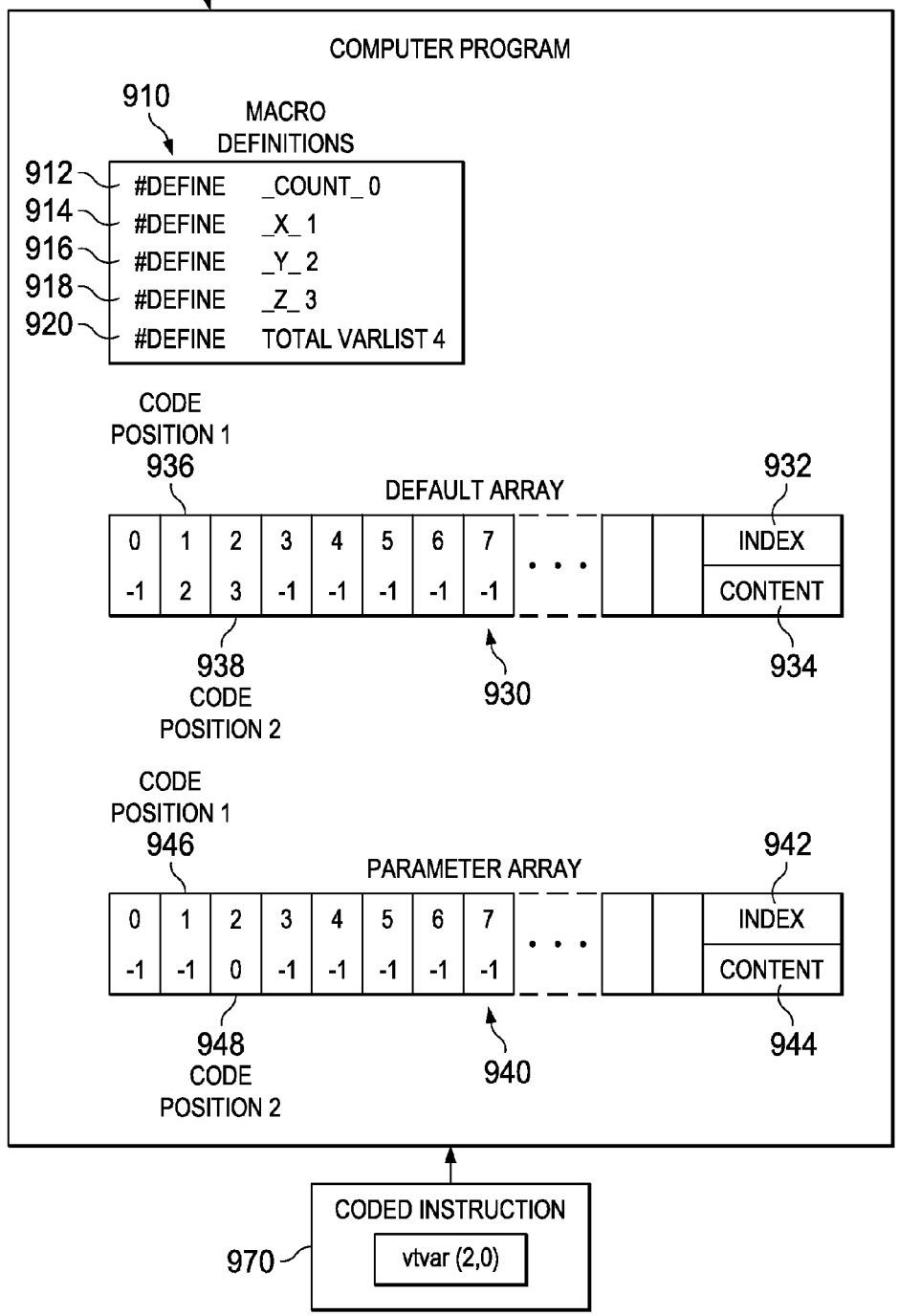
FIG. 9 is a visual representation of a defined list of virtual variables and their code positions after receiving a coded instruction according to an illustrative embodiment.

Referring now to FIG. 9, a visual representation of a defined list of virtual variables and their code positions after receiving a coded instruction is shown according to an illustrative embodiment. Computer program 900 is computer program 800 of FIG. 8.

Computer program 900 includes macro definitions 910. Macro definitions 910 are macro definitions 810 of FIG. 8. Macro definitions 910 include "_Count_" variable macro 912, "_X_" variable macro 914, "_Y_" variable macro 916, "_Z_" variable macro 918, and "Total varlist" variable macro 920.

Default array 930 is default array 830 of FIG. 8. Default array 930 includes index 932, content 934, code position 1 936, and code position 2 938.

Parameter array 940 is parameter array 840 of FIG. 8. Parameter array 940 includes index 942, content 944, code position 1 946, and code position 2 948.

Coded instruction 970 can be an instruction string, such as instruction string 308 of FIG. 3. Coded instruction 970 is an instruction that causes computer program 900 to replace content 944 of parameter array 940 with a new value at an indicated code position. In the present example, coded instruction 970 is:

vtvar (2,0)

The "2" within coded instruction 970 indicates a second code position. The "0" within coded instruction 970 corresponds to the first defined variable within computer program 900, "count" variable macro 912. When computer program 900 encounters coded instruction 970 during runtime, computer program 900 overwrites content 944 of code position 2 948 with the value "0", indicating that computer program 900 should now resolve content 944 corresponding to index 942 at code position 2 948 to "count" variable macro 912 of macro definitions 910. Because code position 2 948 corresponds to content other than the default value, then computer program 900 will resolve content 944 corresponding to index 942 at the indicated code position to the corresponding one of macro definitions 910 indicated within parameter array 940. In the present example, computer program 900 therefore does not utilize default array 930 in order to determine the corresponding one of macro definitions 910 to be used.

Figure 10:
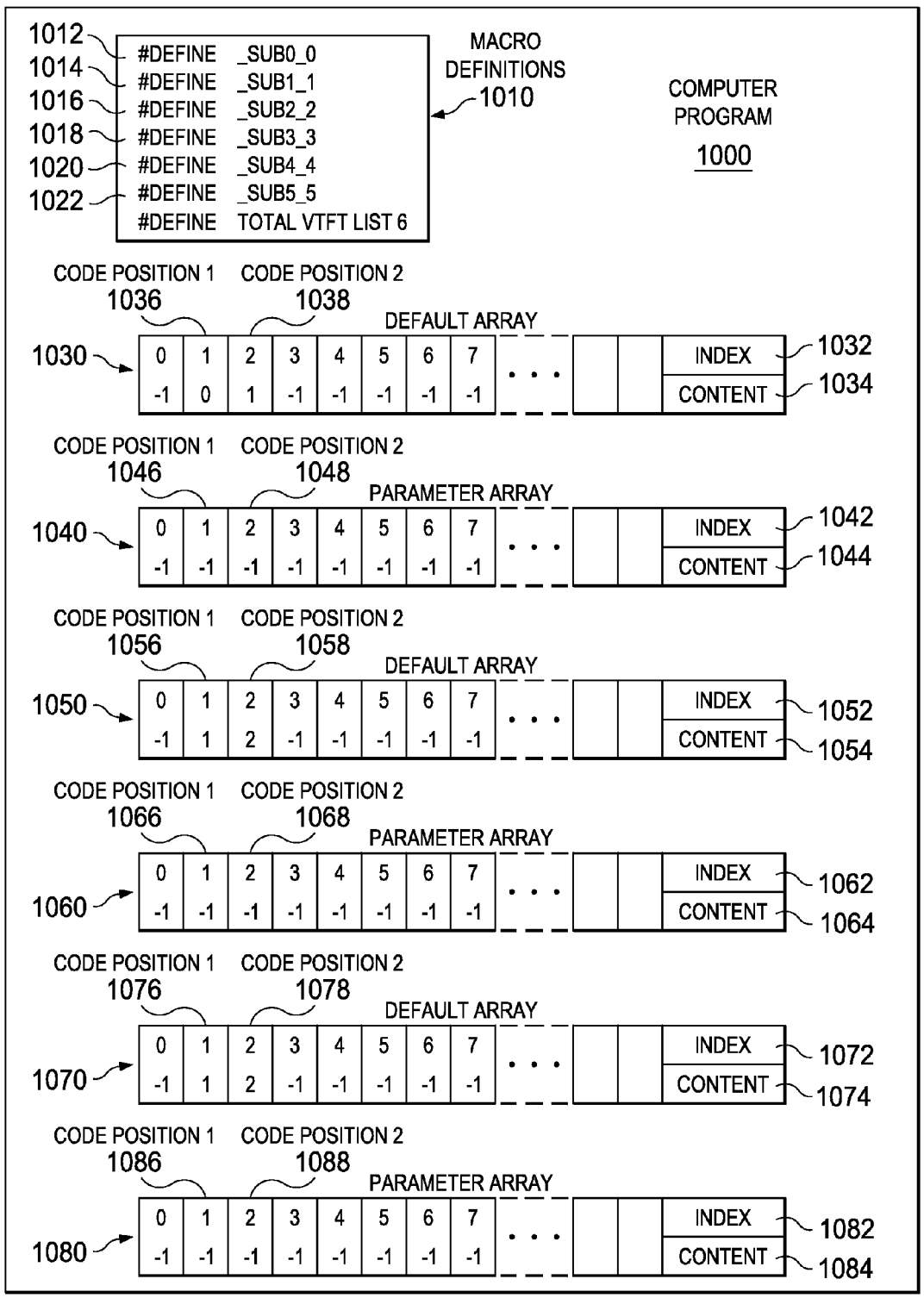
FIG. 10 is a visual representation of a defined list of functions for a virtual function and its code positions according to an illustrative embodiment.

Referring now to FIG. 10, a visual representation of a defined list of functions for a virtual function and its code positions is shown according to an illustrative embodiment. Computer program 1000 is computer program 500 of FIG. 5.

Computer program 1000 includes macro definitions 1010. Macro definitions 1010 define function macros that are used to express functions implemented within a virtual function. For the purpose of simplifying the explanation, the functions defined by macro definitions 1010 are only one example of functions that can be implemented within a virtual function. Macro definitions 1010 can include, for example, but not limited to, the following functions:

"_SUB0_" function 1012 represents a first defined function within computer program 1000;

"_SUB1_" function 1014 represents a second defined function within computer program 1000;

"_SUB2_" function 1016 represents a third defined function within computer program 1000;

"_SUB3_" function 1018 represents a fourth defined function within computer program 1000;

"_SUB4_" function 1020 represents a fifth defined function within computer program 1000; and "_SUB5_" function 1022 represents a sixth defined function within computer program 1000.

Default functions are tracked within default array 1030. Default array 1030 can be defined by a statement, such as, but not limited to: int vtftdef[MAXCP+1]

Default array 1030 is a data structure that correlates positions within computer program 1000 to initially assigned virtual function default definitions obtained from macro definitions 1010. Index 1032 lists positions within computer program 1000. Content 1034 lists a defined function within computer program 1000. Thus, in the illustrative example, code position 1 1036 correlates to "_SUB0_" function 1012 while code position 2 1038 correlates to "_SUB1_" function 1014.

Parameter functions are tracked within parameter array 1040. Parameter array 1040 can be defined by a statement, such as, but not limited to: int vtftpar[MAXCP+1]

Parameter array 1040 is a data structure that correlates macro definitions, such as macro definitions 1010 to positions within computer program 1000. Those positions within computer program 1000 are received within coded instructions, such as coded instructions within instruction strings, during execution of computer program 1000. Index 1042 lists positions within computer program 1000. Content 1044 lists any defined functions within computer program 1000 that are identified within coded instructions during run time of computer program 1000. Parameter array 1040 is used to represent any coded instruction that has been sent to computer program 1000. Parameter array 1040 remains empty until a coded instruction is identified during execution of computer program 1000. In the illustrative example, no coded instructions containing a defined function within computer program 1000 has been received. Therefore, content 1044 has a default value. In the present illustrative example, the default value for content 1044 is, "−1". Thus, in the illustrative example, code position 1 1046 and code position 2 1048 do not correlate to any defined functions within computer program 1000.

Any additional parameters utilized by a defined function are tracked in a corresponding array. For example, in one illustrative embodiment, "_SUB 1_" function 1014 may require two parameters, an integer and a character string. Thus, initial parameter 1 functions for the integer parameter are tracked within default array 1050. Initial parameter 2 functions for the character string parameter are tracked within default array 1070. Default array 1050 and default array 1070 can be defined by statements, such as, but not limited to:
int vtftdef_par1[MAXCP+1]
char vtftdef_par2[MAXCP+1]

Default array 1050 is a data structure that correlates positions within computer program 1000 to initially assigned integer parameters within "_SUB1_" function 1014. Index 1052 lists positions within computer program 1000. Content 1054 references integer parameters within computer program 1000. Thus, in the illustrative example, code position 1 1056 correlates to a first integer parameter (not shown) within "_SUB1_" function 1014, while code position 2 1058 correlates to a second integer parameter (not shown) within "_SUB1_" function 1014.

Default array 1070 is a data structure that correlates positions within computer program 1000 to initially assigned character strings within "_SUB1_" function 1014. Index 1072 lists positions within computer program 1000. Content 1074 references character strings within computer program 1000. Thus, in the illustrative example, code position 1 1076 correlates to a first character string (not shown) within "_SUB1_" function 1014, while code position 2 1078 correlates to a second character string (not shown) within "_SUB1_" function 1014.

For clarity purposes, "_SUB1_" function 1014 is shown having only two parameters, one integer parameter tracked by default array 1050 and one string parameter tracked by default array 1070. However, more or less parameters can be added as is needed by the function. Depending on which function is being called in the code path, the parameters may or may not be used by that function.

Parameter functions are tracked within parameter array 1060 and parameter array 1080. Parameter array 1060 and parameter array 1080 can be defined by statements, such as, but not limited to:
int vtftpar_par1[MAXCP+1]
char vtftpar_par2[MAXCP+1]

Parameter array 1060 is a data structure that correlates positions within computer program 1000 to an integer parameter within "_SUB1_" function 1014 which are received within coded instructions, such as coded instructions within instruction strings, during execution of computer program 1000. Index 1062 lists positions within computer program 1000. Content 1064 lists any defined function within computer program 1000 that is identified within coded instructions during execution of computer program 1000. Parameter array 1060 is used to represent any coded instruction that has been sent to computer program 1000. Parameter array 1060 remains empty until a coded instruction is received during execution of computer program 1000. In the illustrative example, no coded instructions containing a defined function within computer program 1000 have been received. Therefore, content 1064 has a default value. In the present illustrative example, the default value for content 1064 is, "−1". Thus, in the illustrative example, code position 1 1066 and code position 2 1068 do not correlate to any defined functions within computer program 1000.

Parameter array 1080 is a data structure that correlates positions within computer program 1000 to character strings within "_SUB1_" function 1014, which are received within coded instructions, such as coded instructions within instruction strings, during execution of computer program 1000. Index 1082 lists positions within computer program 1000. Content 1084 lists any defined functions within computer program 1000 that are identified within coded instructions during execution of computer program 1000. Parameter array 1080 is used to represent any coded instruction that has been sent to computer program 1000. Parameter array 1080 remains empty until a coded instruction is received during execution of computer program 1000. In the illustrative example, no coded instructions containing a defined function within computer program 1000 have been received. Therefore, content 1084 has a default value. In the present illustrative example, the default value for content 1084 is, "−1". Thus, in the illustrative example, code position 1 1086 and code position 2 1088 do not correlate to any defined functions within computer program 1000.

During execution of computer program 1000, whenever a virtual function, such as virtual function 302 of FIG. 3 is encountered within the code path being run, computer program 1000 first checks index 1042 of parameter array 1040 at the code position indicated by the virtual function. If content 1044 corresponding to index 1042 at the indicated code position is a value other than the default value, then computer program 1000 will resolve content 1044 corresponding to index 1042 at the indicated code position to the corresponding one of macro definitions 1010 indicated within parameter array 1040.

However, if content 1044 corresponding to index 1042 at the indicated code position is the default value, then the virtual function will instead utilize default array 1030 in order to determine the corresponding one of macro definitions 1010 to be used. Computer program 1000 will therefore resolve content 1034 corresponding to index 1032 at the indicated code position to the corresponding one of macro definitions 1010 indicated within default array 1030.

Similarly, any parameters passed to the virtual function will also be determined by first checking parameter array 1060 and parameter array 1080. If the content at the code position indicated by the virtual function is a value other than the default value, computer program 1000 will utilize content 1064 or content 1084 at the code position indicated by the virtual function. Otherwise, computer program 1000 will utilize content 1054 or content 1074 at the code position indicated by the virtual function. For example, the following virtual function is encountered within the code path of computer program 1000:

VTFT(1,_sub0_, I, ptr)

The "1" within the virtual function indicates a first code position. "I" is an integer variable in computer program 1000 which is a default first parameter. "Ptr" is a character variable in computer program 1000 being used for the second parameter. Computer program 1000 first checks code position 1 1046 of parameter array 1040. Code position 1 1046 has content 1044 of the default value "−1". Because code position 1 1046 has a default value, computer program 1000 then checks code position 1 1036 of default array 1030. Code position 1 1036 has content 1034 of "0", indicating that "_SUB0_" function 1012 should be utilized. Computer program 1000 will therefore resolve content 1034 corresponding to index 1032 at code position 1 1036 to "_SUB0_" function 1012 of macro definitions 1010. This method of resolving code position 1 1036 is also used to resolve any parameters utilized by "_SUB0_" function 1012.

As another example, the following virtual function having nested virtual variables therein is encountered within the code path of computer program 1000:

VTFT (2,_sub0_,*VTVARP(1,_F01_,_0_), (char*)*(VTVARP(2,_F01_,_0_))

The "2" within the virtual function indicates a second code position. "VTVARP(1,_F01_,_0_)" is a virtual variable in computer program 1000 which is a default first parameter. "(char*)*(VTVARP(2,_F01_,_0_)" is a character virtual variable in computer program 1000 being used for the second parameter. Parameters defined by virtual variables "VTVARP (1,_F01_,_0_)" and "(char*) *(VTVARP(2,_F01_,_0_)" are determined as shown in FIG. 8 and FIG. 9.

Computer program 1000 first checks code position 2 1048 of parameter array 1040. Code position 2 1048 has content 1044 of the default value "−1". Because code position 2 1048 has a default value, computer program 1000 then checks code position 2 1038 of default array 1030. Code position 2 1038 has content 1034 of "1", indicating that "_SUBL_" function 1014 should be utilized. Computer program 1000 will therefore resolve content 1034 corresponding to index 1032 at code position 2 1038 to "_SUB1_" function 1014 of macro definitions 1010.

Additionally, the virtual function contains a virtual variable. The virtual variable is resolved in a manner similar to that described in FIG. 8 and FIG. 9. The integer virtual variable VTVARP (1,_F01_,_0_) utilizes default array 1050 and parameter array 1060. The character virtual variable (char*)*(VTVARP(2,_F01_,_0_) utilizes default array 1070 and parameter array 1080.

In an illustrative embodiment, virtual variables utilized by a virtual function can be changed without changing the virtual function itself. In this embodiment, computer program 1000 checks parameter arrays for the virtual variable, such as parameter array 1060 and parameter array 1080, independently of the parameter arrays for the virtual function. Thus, while parameter array 1040 may indicate a default value at a certain code position of content 1044, parameter array 1060 and parameter array 1080 may indicate values other than a default value. However, in the present embodiment, computer program 1000 would utilize default array 1030 to resolve the virtual function and default array 1050 and default array 1070 to resolve the virtual variables for that virtual function.

Figure 11:
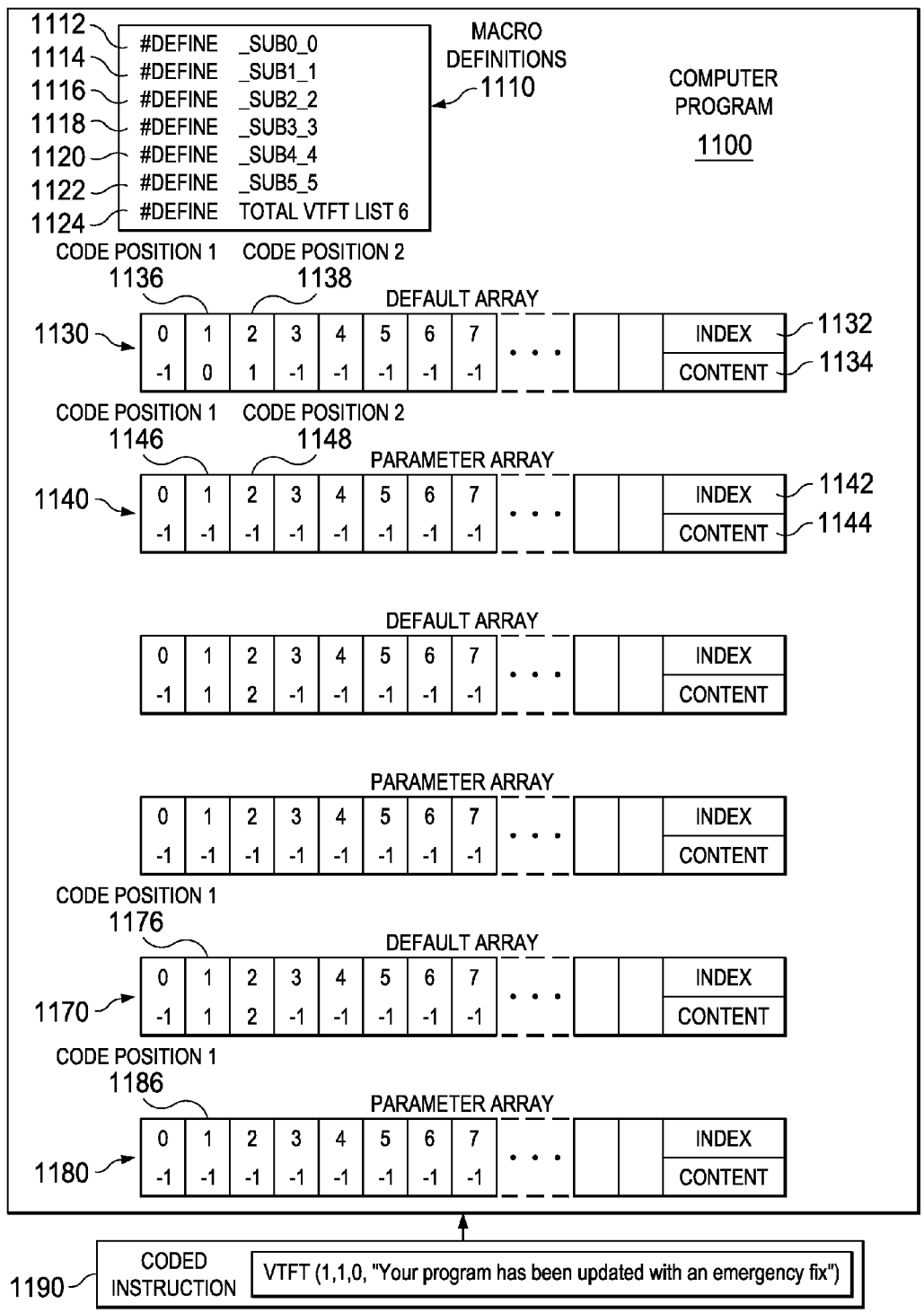
FIG. 11 is a visual representation of a defined list of virtual functions and their code positions after receiving a coded instruction according to an illustrative embodiment.

Referring now to FIG. 11, a visual representation of a defined list of virtual functions and their code positions after receiving a coded instruction is shown according to an illustrative embodiment. Computer program 1100 is computer program 1000 of FIG. 10.

Computer program 1100 includes macro definitions 1110. Macro definitions 1110 are macro definitions 1010 of FIG. 10. Macro definitions 1110 include "_SUB0_" function 1112, "_SUB1_" function 1114, "_SUB2_" function 1116, "_SUB3_" function 1118, "_SUB4_" function 1120, "_SUB5_" function 1122, and "Total Virtual Function List" variable 1124.

Default array 1130 is default array 1030 of FIG. 10. Default array 1130 includes index 1132, content 1134, code position 1 1136, and code position 2 1138.

Parameter array 1140 is parameter array 1040 of FIG. 10. Parameter array 1140 includes index 1142, content 1144, code position 1 1146, and code position 2 1148.

Coded instruction 1190 can be an instruction string, such as instruction string 308 of FIG. 3. Coded instruction 1190 is an instruction that causes computer program 1100 to replace content 1144 of parameter array 1140 with a new value at an indicated code position. In the present example, coded instruction 1190 is:

VTFT (1, 1, 0, "Your program has been updated with an emergency fix")

The "1" within coded instruction 1190 indicates a first code position. The "1" within coded instruction 1190 indicates that the content of the first code position should be overwritten to "1". Thus, coded instruction 1190 overwrites "1" into code position 1 1146 of parameter array 1140. "1" corresponds to the second defined function within computer program 1100, "_SUB1_" function 1114.

When computer program 1100 encounters coded instruction 1190 during runtime, computer program 1100 overwrites content 1144 of code position 1 1146 with the value "1", indicating that computer program 1100 should now resolve content 1144 corresponding to index 1142 at code position 1 1146 to "_SUB1_" function 1114 of macro definitions 1110. Because code position 1 1146 corresponds to content other than the default value, computer program 1100 will resolve content 1144 corresponding to index 1142 at the indicated code position to the corresponding one of macro definitions 1110 indicated within parameter array 1140. Because parameter array 1140 indicates a value other than the default value, computer program 1100 will utilize content 1144 at the code position indicated by the virtual function. In the present example, computer program 1100 therefore does not utilize default array 1130 in order to determine the corresponding one of macro definitions 1110 to be used. The string, "Your program has been updated with an emergency fix" represents a string parameter that is passed to the virtual function. The string parameter is stored in parameter array 1180 at code position 1 1186. Upon execution, "_SUB1_" function 1114 utilizes the string, "Your program has been updated with an emergency fix" instead of any default string that was previously assigned within default array 1170 at code position 1 1176.

Figure 12:
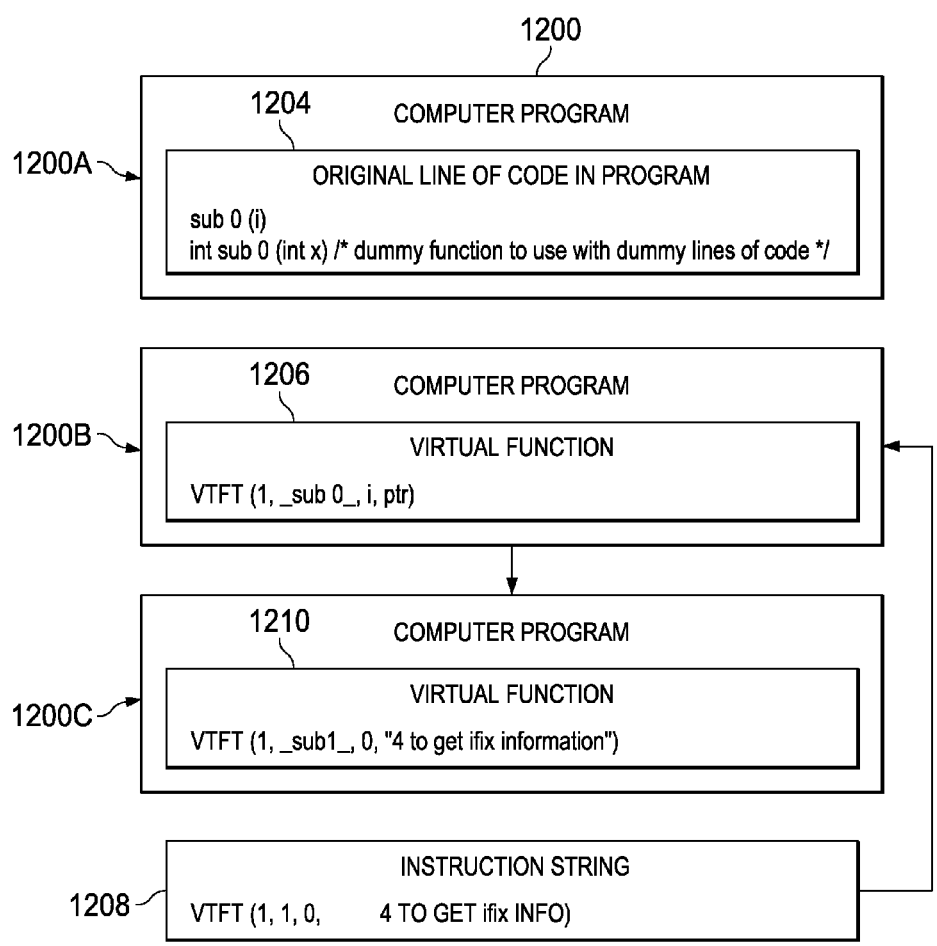
FIG. 12 is a block diagram of virtual functions which may be implemented in illustrative embodiments.

With reference now to FIG. 12, a block diagram of virtual functions which may be implemented in illustrative embodiments is depicted. Computer program 1200 in this illustrative example may be written in the C programming language. Computer program 1200 in this illustrative example can be computer program 500 of FIG. 5. Computer program 1200 may include a virtual function, such as virtual function 302 of FIG. 3. Computer program 1200 may have a number of virtual functions.

Virtual functions allow a computer program developer to modify the behavior of computer program 1200 during execution of computer program 1200. In one illustrative embodiment, virtual functions allow a computer program developer to augment computer program 1200 to include additional functionalities or fewer functionalities during runtime.

Virtual functions provide the capability to a computer program developer to include functionalities in computer program 1200. By default, these functionalities may or may not perform any action or process but may be modified during runtime to effectuate the functionalities. For example, assume that computer program 1200A has function 1204. Function 1204 does not perform any specific action or process. Function 1204 may be replaced in the source code of computer program 1200 with a virtual function, such as virtual function 1206, to form computer program 1200B. Virtual function 1206 may be formatted as: "VTFT (1,_sub0_, i, ptr)". Virtual function 1206 may be written individually or to include nested virtual types.

During execution of computer program 1200, to change the first line of virtual function 1206 from VTFT (1,_sub0_, i, ptr), an instruction string, such as instruction string 1208 may be submitted to computer program 1200. When computer program 1200 receives instruction string 1208, computer program 1200 replaces each value assigned to each parameter in virtual function 1206 with new values identified in instruction string 1208. Instruction string 1208 can be formatted as:

VTFT(1,1,0, "4 to get ifix information")

Computer program 1200 will now execute as if computer program 1200 had been originally written with virtual function 1210, e.g., had originally been written as computer program 1200C. Virtual function 1210 allows computer program 1200 to function as if computer program 1200 were originally coded with equivalent function _sub1_.

Figure 13:
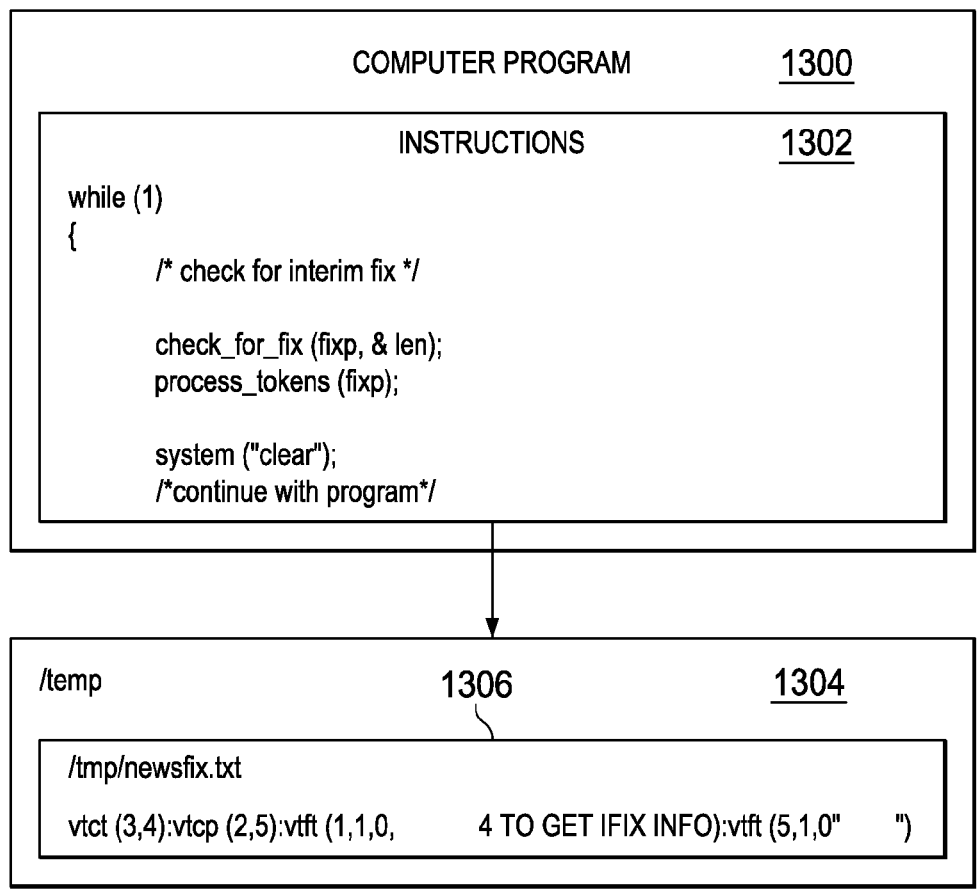
FIG. 13 is a block diagram for changing virtual function parameters through external instruction strings in accordance with an illustrative embodiment.

Referring now to FIG. 13, a block diagram for changing virtual function parameters through external instruction strings is depicted in accordance with an illustrative embodiment. Computer program 1300 in this illustrative example may be written in the C programming language. Computer program 1300 in this illustrative example can be any of computer programs 300-1200. Computer program 1300 may include a virtual function, such as virtual function 302 of FIG. 3. Computer program 1300 may have a number of virtual functions.

During runtime, computer program 1300 is coded to check for coded instructions that contain virtual functions, such as virtual function 302 of FIG. 3. To perform this check, computer program 1300 includes instructions 1302 that comprise a "while" loop. Within the "while" loop is a check_for_fix function. The check_for_fix function directs computer program 1300 to search for coded instructions, such as coded instructions within an instruction string, in a defined location, such as location 1304.

Location 1304 is a directory, folder, data store, data structure, or other addressable location in which an instruction string or virtual function can be stored. Location 1304 is continuously checked during execution of the "while" loop for the presence of instruction string 1306.

Computer program 1300 further includes a process_tokens function, which can be process_token function 311 of FIG. 3, within the "while" loop. The process tokens function parses instruction string 1306 for identifications of virtual types, e.g., "vtvt(3,4)" and "vtcp(2,5")", and virtual functions, e.g., "vtft(1,1,0, 4 TO GET IFIX INFO)" and "vtft(5,1,0," "). Computer program 1300 then processes these identifications in manners previously discussed to modify the behavior of computer program 1300, without recompiling computer program 1300.

Figure 14:
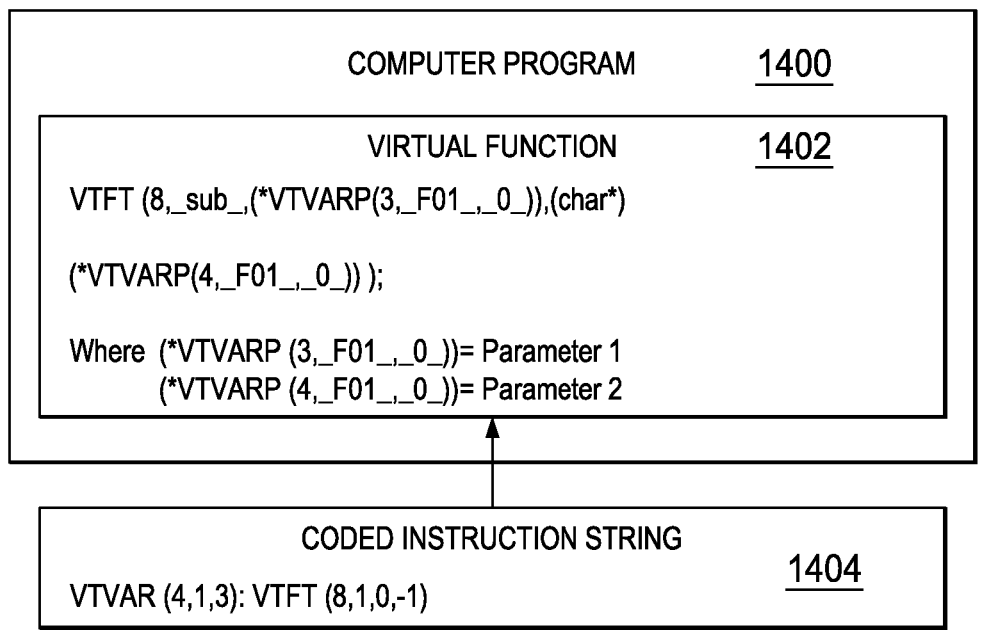
FIG. 14 is a block diagram for changing virtual function parameters through internal program parameters in accordance with an illustrative embodiment.

Referring now to FIG. 14, a block diagram for changing virtual function parameters through internal program parameters is depicted in accordance with an illustrative embodiment. Computer program 1400, in this illustrative example, may be written in the C programming language. Computer program 1400, in this illustrative example, can be any of computer programs 300-1200. Computer program 1400 may include a virtual function, such as virtual function 302 of FIG. 3. Computer program 1400 may have a number of virtual functions.

Virtual function 1402 is a virtual function, such as virtual function 302 of FIG. 3. Virtual function 1402 includes virtual variables as parameters. This is an example of nesting of virtual types. The virtual variable parameters of virtual function 1402 are defined within computer program 1400. In this illustrative embodiment, virtual function 1402 does not perform any action or process but may be modified during runtime to effectuate or modify functionalities.

During runtime, computer program 1400 executes an instruction string, such as instruction string 1404. Instruction string 1404 includes both a virtual variable and a virtual function. The virtual variable coded instruction indicates what the parameters of the virtual function coded instruction should be. The virtual function coded instruction modifies virtual function 1402 in order to effectuate new functionality. The present illustrative embodiment utilizes a virtual function nested with a virtual variable, enabling parameter values to be chosen internal to the program instead of from an external value.

Figure 15:
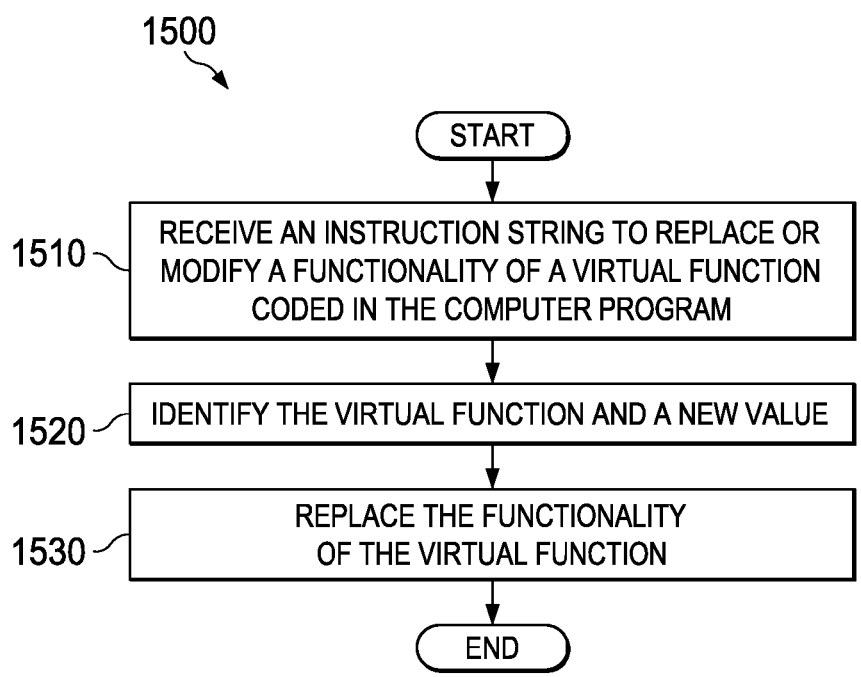
FIG. 15 is a flowchart illustrating a process for modifying a computer program through external instruction strings while the computer program is executing in accordance with an illustrative embodiment.

With reference now to FIG. 15, a flowchart illustrating a process for modifying a computer program through external instruction strings while the computer program is executing is depicted in accordance with an illustrative embodiment. The computer program can be computer program 1300 of FIG. 13. Process 1500 is a more detailed process for process_token function 311 of FIG. 3.

The modification of the computer program begins with the computer program receiving an instruction string to replace or modify a functionality of a virtual function coded in the computer program (step 1510). The computer program may have been coded with a number of virtual functions.

Responsive to receiving the instruction string, the computer program identifies the virtual function and a new value (step 1520). The computer program uses functionality of the virtual function that is identified in the instruction string to replace the functionality assigned to the virtual function coded in the computer program. The computer program can identify the virtual function by referencing a code position within a default array or a parameter array, such as, for example, default array 630 of FIG. 6 and parameter array 640 of FIG. 6.

Responsive to identifying the functionality of the virtual function that is received, the computer program replaces the functionality of the virtual function (step 1530), resulting in the computer program being modified. Replacing the functionality of the virtual function can be, for example, but not limited to, replacing a value within a parameter array associated with the virtual function at a code position identified by the instruction string, such as, for example, but not limited to, code position 1 636 of FIG. 6. This modification to the computer program is made during an execution of the computer program without stopping and/or interrupting the computer program execution.

Figure 16:
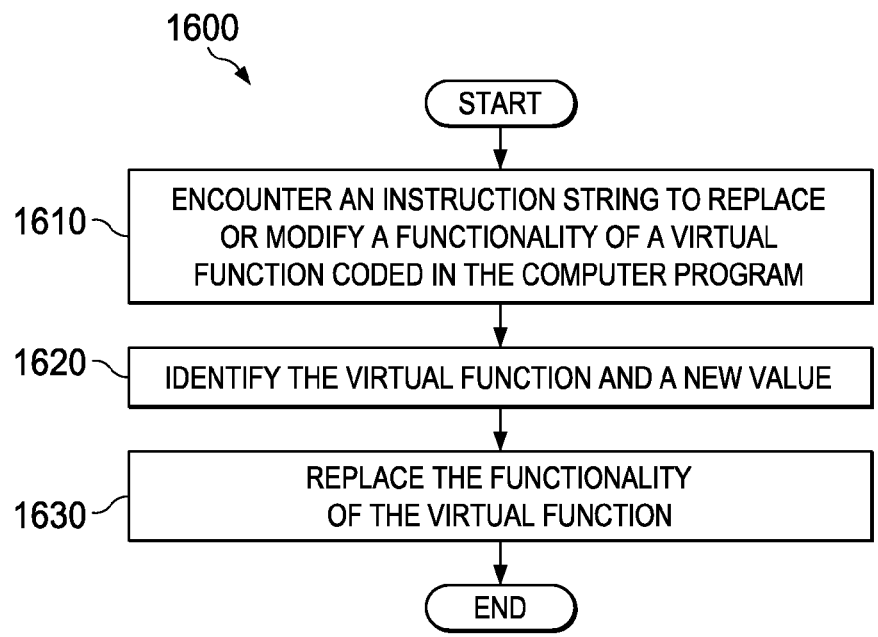
FIG. 16 is a flowchart illustrating a process for modifying a computer program through internal program parameters while the computer program is executing in accordance with an illustrative embodiment.

With reference now to FIG. 16, a flowchart illustrating a process for modifying a computer program through internal program parameters while the computer program is executing is depicted in accordance with an illustrative embodiment. The computer program can be computer program 1400 of FIG. 14. Process 1600 is a more detailed process for process_token function 311 of FIG. 3.

The modification of the computer program begins with the computer program encountering an instruction string to replace or modify a functionality of a virtual function coded in the computer program (step 1610). The computer program may have been coded with a number of virtual functions.

Responsive to encountering the instruction string, the computer program identifies the virtual function and a new value (step 1620). The computer program uses functionality of the virtual function identified in the instruction string to replace the functionality assigned to the current virtual function coded in the computer program. The computer program can identify the virtual function by referencing a code position within a default array or a parameter array, such as, for example, default array 630 of FIG. 6 and parameter array 640 of FIG. 6.

Responsive to identifying the functionality of the virtual function that is received, the computer program replaces the functionality of the virtual function (step 1630), resulting in the computer program being modified. Replacing the functionality of the virtual function can be, for example but not limited to, replacing a value within a parameter array associated with the virtual function at a code position identified by the instruction string, such as, for example, but not limited to, code position 1 636 of FIG. 6. This modification to the computer program is made during an execution of the computer program without stopping and/or interrupting the computer program execution. Process 1600 terminates thereafter.

Figure 17:
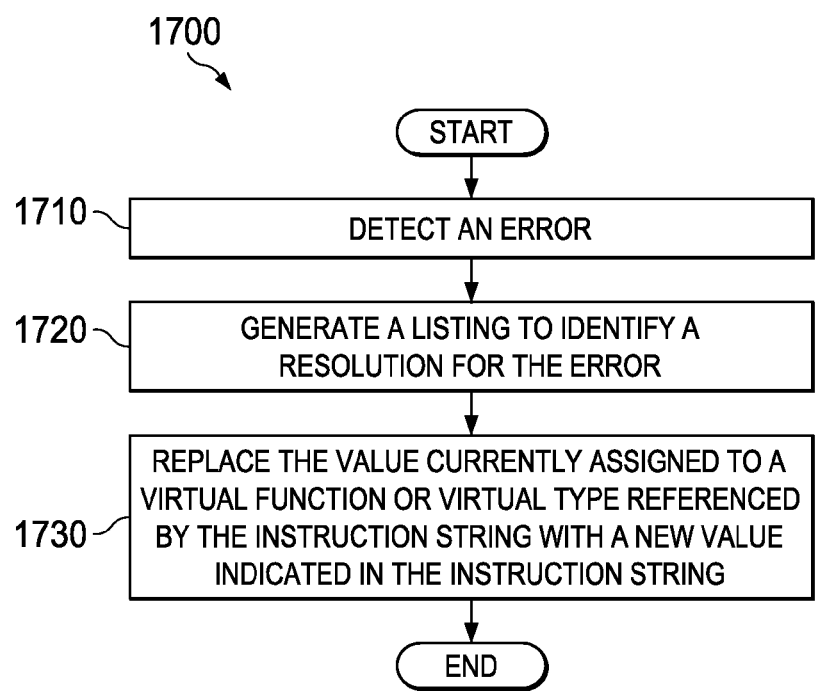
FIG. 17 is a flowchart illustrating a process for modifying a computer program to resolve an error while the computer program is executing in accordance with an illustrative embodiment.

With reference now to FIG. 17, a flowchart illustrating a process for modifying a computer program to resolve an error while the computer program is executing is depicted in accordance with an illustrative embodiment. The computer program can be computer program 1300 of FIG. 13. Process 1700 is a more detailed process for process_token function 311 of FIG. 3.

During an execution of the computer program, which is coded with a number of virtual functions, an error is detected (step 1710). A user, such as user 416 of FIG. 4, may detect the error occurring in the computer program. A technical support user, such as technical support user 418 of FIG. 4, reviewing the execution of the computer program may also detect the error.

In another illustrative embodiment, an error detection process may detect the error. For example, a user executing the computer program determines the computer program is outputting incorrect information. The user reports the error to the technical support user responsible for reviewing and maintaining the computer program. To identify a resolution for the error, the technical support user may generate a listing (step 1720). The listing lists each virtual function, virtual type, and the values assigned to each virtual type currently being used in the computer program. The technical support user uses this listing to determine the virtual function in which the error is occurring. The technical support user may instruct the user to submit an instruction string for a modification of one or more virtual functions or virtual types. When the computer program receives the instruction string, the computer program replaces the value currently assigned to the virtual function or virtual type with the new value indicated in the instruction string (step 1730). Process 1700 terminates thereafter.

With reference now to FIGS. 18A-18E, computer program code listing is depicted in accordance with the illustrative embodiments. Code 1800 in FIG. 18A is an example of one implementation of any of computer programs 300-1400. Code 1800 may be created using the C programming language. However, the different illustrative embodiments disclosed herein, may be implemented using other programming languages. The other programming languages may be, for example, object-oriented and/or procedural programming languages. Code 1800 may have virtual functions, such as statements 1802, 1804, 1806, 1808, 1810, and 1812.

With reference now to FIGS. 19A-19M, computer program code listing of a header file which is associated with a computer program is depicted in accordance with illustrative embodiments. Header file 1900 is an example of an implementation of header file 304 in FIG. 3. Header file 1900 may have definitions of virtual types and values for each virtual type coded in a computer program. Header file 1900 is stored in a memory of a data processing system, such as memory 206 of FIG. 2, and is referenced by a computer program using a "#include" statement. The "#include" statement tells the compiler to insert the contents of the header file into the computer program.

Thus, illustrative embodiments of the present invention provide a computer implemented method, computer system, and computer program product for modifying a computer program during execution of the computer program by a processor unit. A computer program receives an instruction string. The instruction string has a new function data therein for replacing a current function data of a function during execution of the computer program by a processor unit. The function is capable of being changed during execution of the computer program to modify the behavior of the computer program. The computer program replaces the current function data with the new function data. The new function data modifies the computer program. The computer program is modified while the computer program is executed by the processor unit. This modification may allow un-planned changes equivalent to a patch to be made without restarting the program.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for modifying a computer program, the method comprising the steps of:
   a computer receiving a header file defining a number of values associated with a number of virtual functions;
   the computer utilizing the header file to receive an instruction string formatted for interactions with the number of virtual functions of the computer program during execution of the computer program, the instruction string comprising a command line switch, a new value for a virtual function, and instructions to replace a current value in the virtual function with the new value while the computer program is executing, wherein the number of virtual functions have replaced a number of original code segments in the computer program and are configured to receive new values for current values from the instruction string, the instruction string having new function data therein for replacing current function data of a virtual function of the computer program during execution of the computer program by a processor unit, wherein the virtual function is capable of being changed during execution of the computer program to modify behavior of the computer program; and
   the computer replacing the current function data in the virtual function with the new function data, wherein the new function data modifies the computer program, and wherein a behavior of the computer program is modified by an interaction between the virtual function and the instruction string while the computer program is executed by the processor unit.

2. The method of claim 1, further comprising:
responsive to receiving the instruction string, the computer identifying the virtual function and the new function data from the instruction string.

3. The method of claim 1, wherein the step of replacing the current function data further comprises:
the computer replacing the current function data with the new function data identified in the instruction string using a process embodied in the computer program.

4. The method of claim 1, further comprising:
before the step of receiving the instruction string, the computer determining that the instruction string is present within a storage; and
wherein the step of receiving the instruction string comprises the computer receiving the instruction string from the storage.

5. The method of claim 4, further comprising:
before the step of replacing the current function data with the new function data comprises the computer calling a first function to process the new function data; wherein
the step of receiving the instruction string from the storage comprises the computer calling a second function to receive the instruction string from the storage.

6. The method of claim 1, wherein the function and the current function data associated with the function are defined in the header file.

7. The method of claim 3, further comprising:
the computer, via the process embodied in the computer program, reading the instruction string; and
the computer, via the process embodied in the computer program, replacing the current function data with the new function data.

8. A computer program product for modifying a computer program, the computer program product comprising:
one or more computer-readable tangible storage devices;
program instructions, stored on at least one of the one or more storage devices, to receive a header file defining a number of values associated with a number of virtual functions;
program instructions, stored on at least one of the one or more storage devices, to utilize the header file to receive an instruction string formatted for interactions with the number of virtual functions of the computer program during execution of the computer program, the instruction string comprising a command line switch, a new value for a virtual function, and instructions to replace a current value in the virtual function with the new value while the computer program is executing, wherein the number of virtual functions have replaced a number of original code segments in the computer program and are configured to receive new values for current values from the instruction string, the instruction string having new function data therein for replacing current function data of a virtual function of the computer program during execution of the computer program by a processor unit, wherein the virtual function is capable of being changed during execution of the computer program to modify behavior of the computer program; and
program instructions, stored on at least one of the one or more storage devices, to replace the current function data in the virtual function with the new function data, wherein the new function data modifies the computer program, and wherein a behavior of the computer program is modified by an interaction between the virtual function and the instruction string while the computer program is executed by the processor unit.

9. The computer program product of claim 8, further comprising:
program instructions, stored on at least one of the one or more storage devices, responsive to receiving the instruction string, to identify the virtual function and the new function data for the function from the instruction string.

10. The computer program product of claim 8, wherein the program instructions to replace the current function data replace the current function data with the new function data identified in the instruction string and are included in the computer program.

11. The computer program product of claim 8, further comprising:
program instructions, stored on at least one of the one or more storage devices, to determine that the instruction string is present in a storage; and
wherein the program instructions to receive the instruction string receive the instruction string from the storage.

12. The computer program product of claim 11, further comprising:
program instructions, stored on at least one of the one or more storage devices, to call a first function to process the new function data before replacing the current function data with the new function data; and
wherein the program instructions to receive the instruction string from the storage call a second function to receive the instruction string from the storage.

13. The computer program product of claim 8, wherein the function and the current function data associated with the function are defined in the header file.

14. The computer program product of claim 10, further comprising:
program instructions, stored on at least one of the one or more storage devices and included within the computer program, to read the instruction string; and
program instructions, stored on at least one of the one or more storage devices and included within the computer program, to replace the current function data with the new function data.

15. A computer system for modifying a computer program, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to receive a header file defining a number of values associated with a number of virtual functions;
program instructions, stored on at least one of the one or more storage devices for execution by at least one of the one or more processors via at least one of the one or more memories, to utilize the header file to receive an instruction string formatted for interactions with the number of virtual functions of the computer program during execution of the computer program, the instruction string comprising a command line switch, a new value for a virtual function, and instructions to replace a current value in the virtual function with the new value while the computer program is executing, wherein the number of virtual functions have replaced a number of original code segments in the computer program and are configured to receive new values for current values from the instruction string, the instruction string having new function data therein for replacing current function data of a virtual function of the computer program during execution of the computer program by a processor unit, wherein the virtual function is capable of being changed during execution of the computer program to modify behavior of the computer program; and program instructions, stored on at least one of the one or more storage devices for execution by at least one of the one or more processors via at least one of the one or more memories, to replace the current function data in the virtual function with the new function data, wherein the new function data modifies the computer program, and wherein a behavior of the computer program is modified by an interaction between the virtual function and the instruction string while the computer program is executed by the processor unit.

16. The computer system of claim 15, further comprising:
program instructions, stored on at least one of the one or more storage devices for execution by at least one of the one or more processors via at least one of the one or more memories, responsive to receiving the instruction string, to identify the virtual function and the new function data for the function from the instruction string.

17. The computer system of claim 15, wherein the program instructions to replace the current function data replace the current function data with the new function data identified in the instruction string and are included in the computer program.

18. The computer system of claim 15, further comprising:
program instructions, stored on at least one of the one or more storage devices for execution by at least one of the one or more processors via at least one of the one or more memories, to determine that the instruction string is present in a storage; and wherein the program instructions to receive the instruction string receive the instruction string from the storage.

19. The computer system of claim 18, further comprising:
program instructions, stored on at least one of the one or more storage devices for execution by at least one of the one or more processors via at least one of the one or more memories, to call a first function to process the new function data before replacing the current function data with the new function data; and wherein the program instructions to receive the instruction string from the storage call a second function to receive the instruction string from the storage.

20. The computer system of claim 15, wherein the function and the current function data associated with the function are defined in the header file.

21. The computer system of claim 17, further comprising:
program instructions, stored on at least one of the one or more storage devices for execution by at least one of the one or more processors via at least one of the one or more memories and included within the computer program, to read the instruction string; and program instructions, stored on at least one of the one or more storage devices for execution by at least one of the one or more processors via at least one of the one or more memories and included within the computer program, to replace the current function data with the new function data.

* * * * *